Sept. 2, 1969 R. L. KLEIN 3,465,289
VALIDITY CHECKING SYSTEM
Filed April 19, 1966 20 Sheets-Sheet 1

INVENTOR
RONALD L. KLEIN
BY
ATTORNEYS

Sept. 2, 1969  R. L. KLEIN  3,465,289
VALIDITY CHECKING SYSTEM
Filed April 19, 1966  20 Sheets-Sheet 2
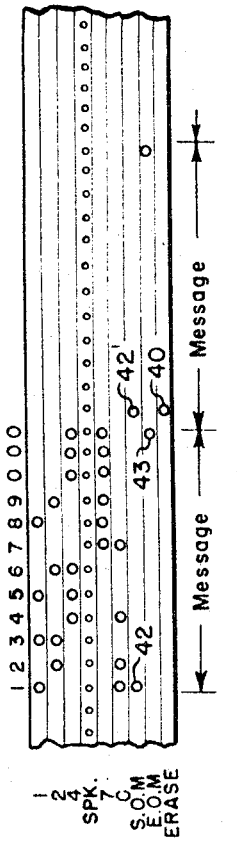
FIG. 3
FIG. 2
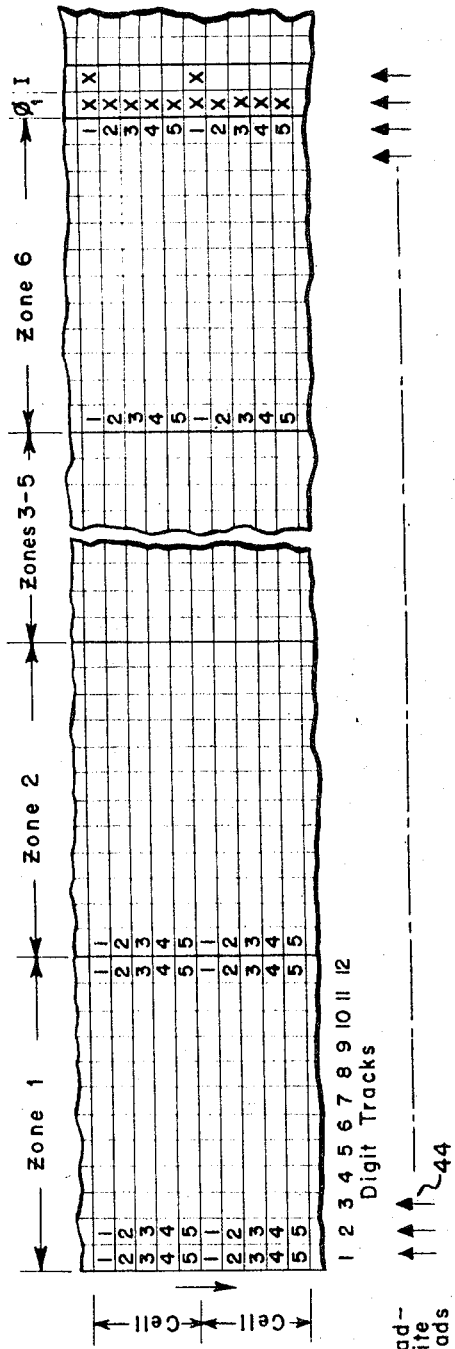
FIG. 4
INVENTOR
RONALD L. KLEIN
BY
ATTORNEYS

INVENTOR
RONALD L. KLEIN
ATTORNEYS

Sept. 2, 1969
R. L. KLEIN
3,465,289
VALIDITY CHECKING SYSTEM
Filed April 19, 1966
20 Sheets-Sheet 4
FIG. 6
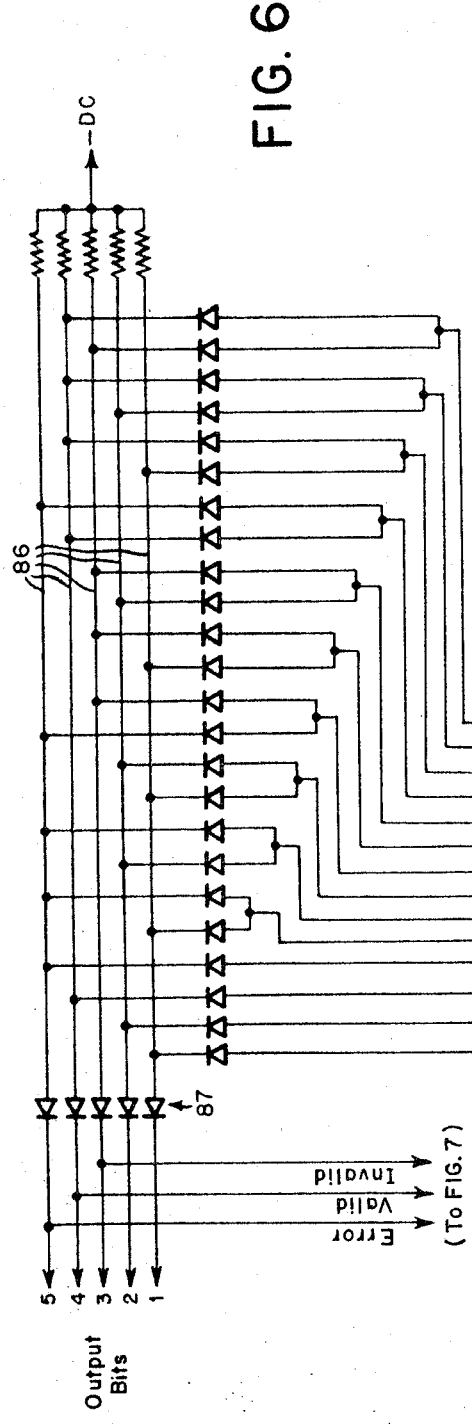
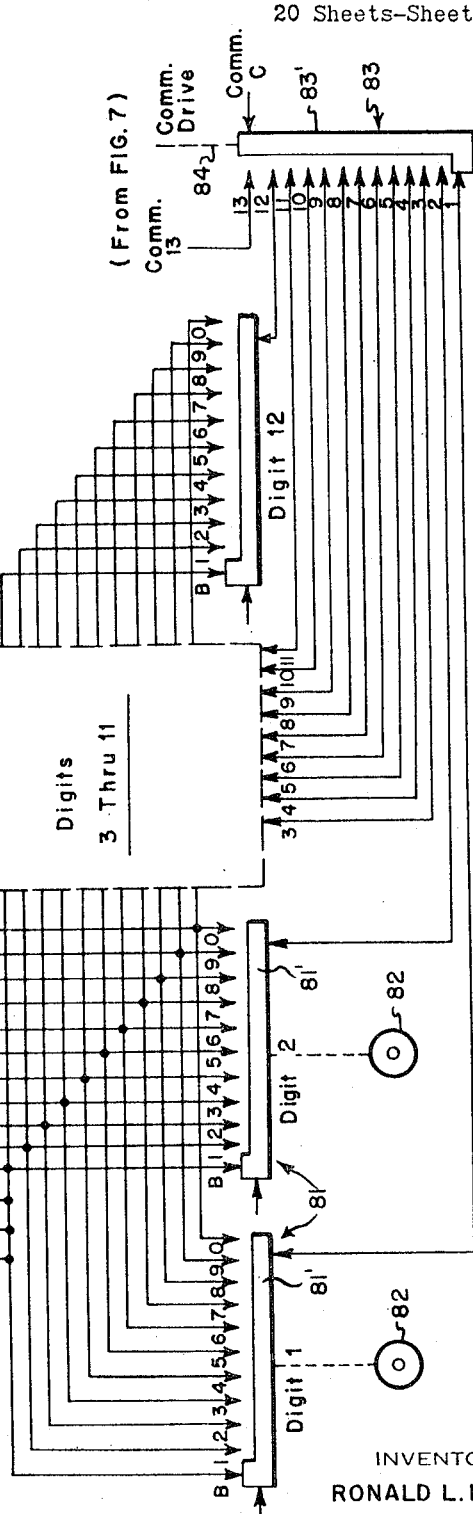
INVENTOR
RONALD L. KLEIN
BY
*Pennie Edmonds Morton Taylor & Adams*
ATTORNEYS

INVENTOR
RONALD L. KLEIN
ATTORNEYS

Sept. 2, 1969    R. L. KLEIN    3,465,289
VALIDITY CHECKING SYSTEM
Filed April 19, 1966    20 Sheets-Sheet 6

INVENTOR
RONALD L. KLEIN
BY
ATTORNEYS

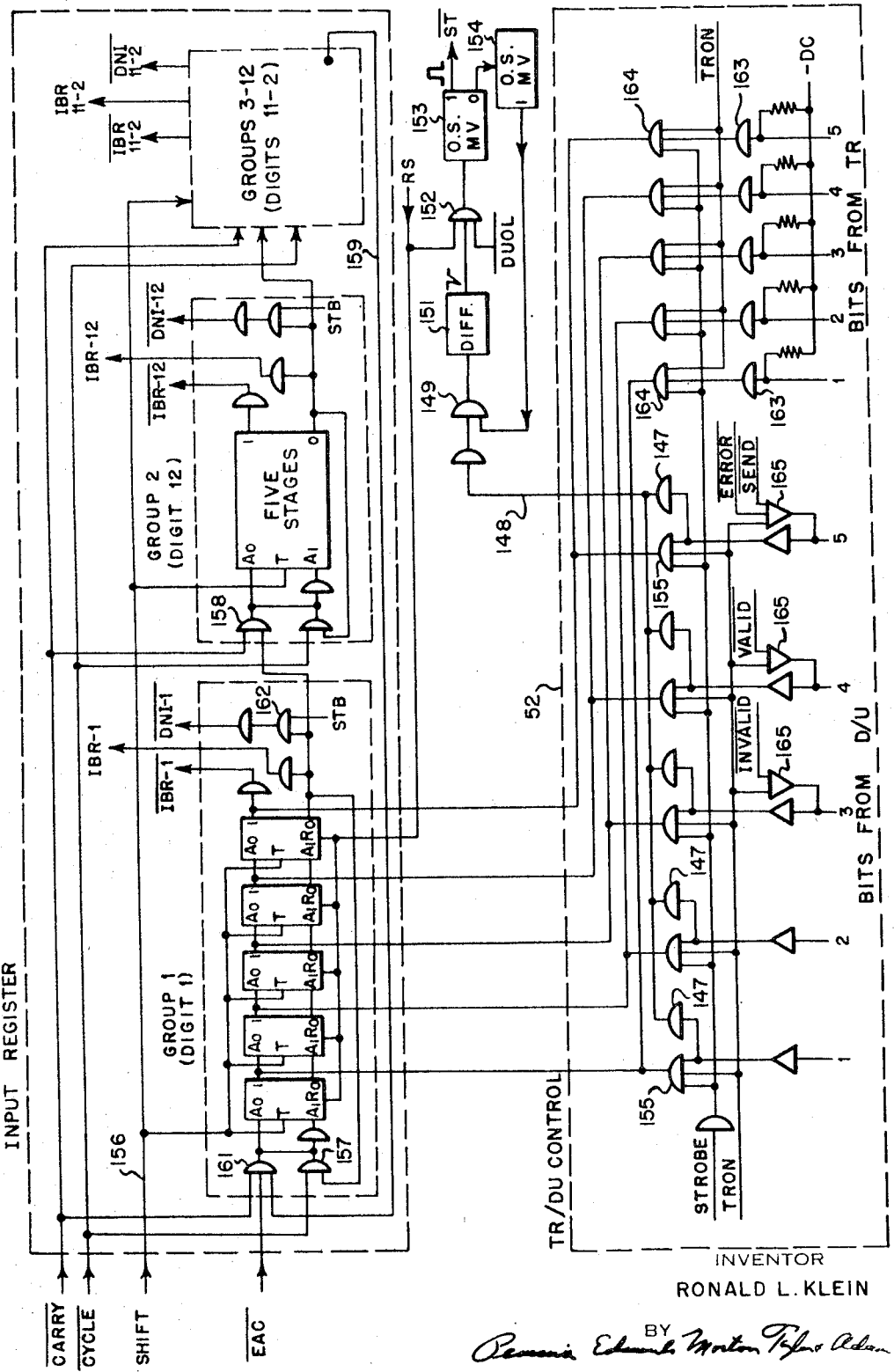

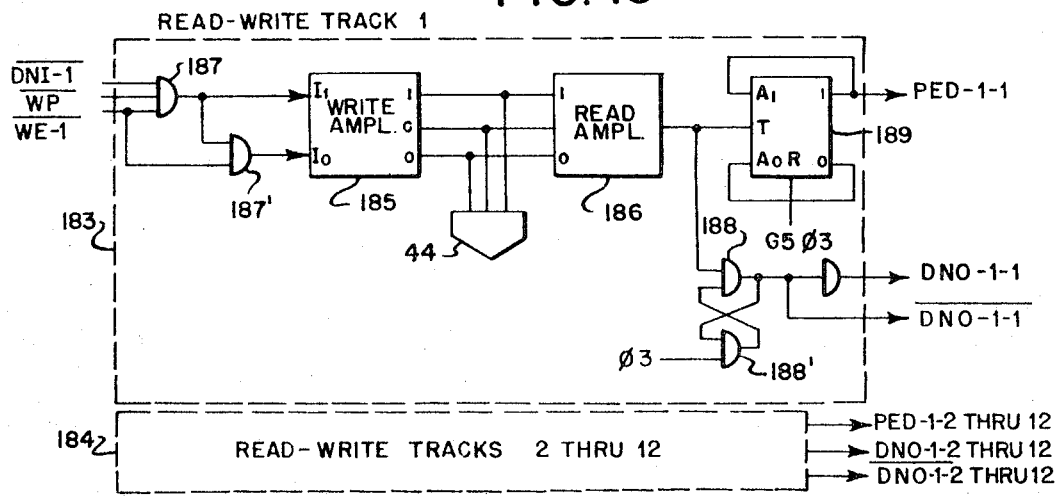
FIG. 13
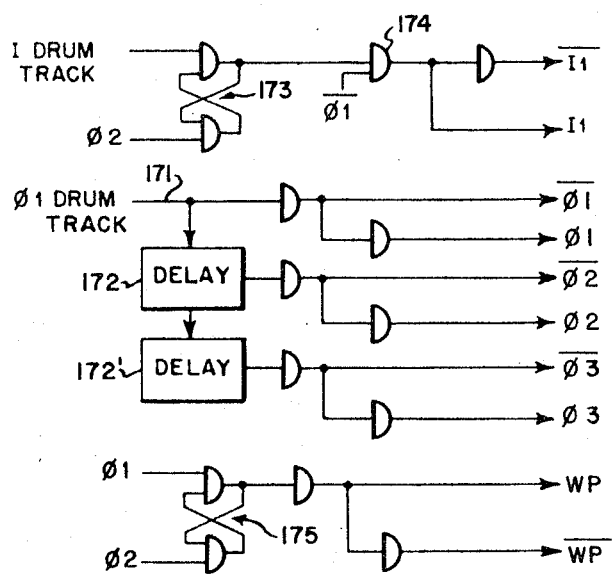
FIG. 11
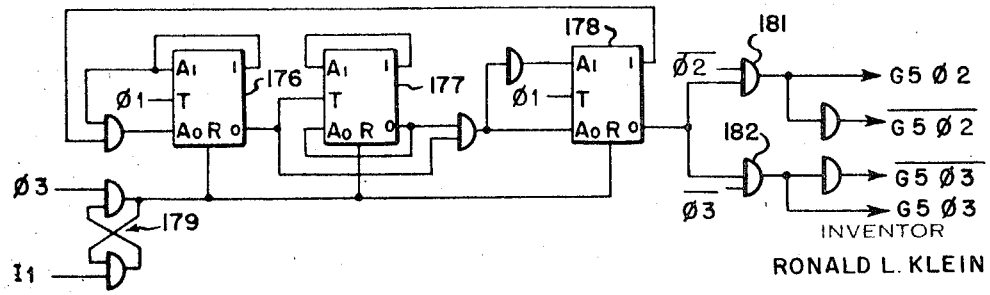
INVENTOR
RONALD L. KLEIN

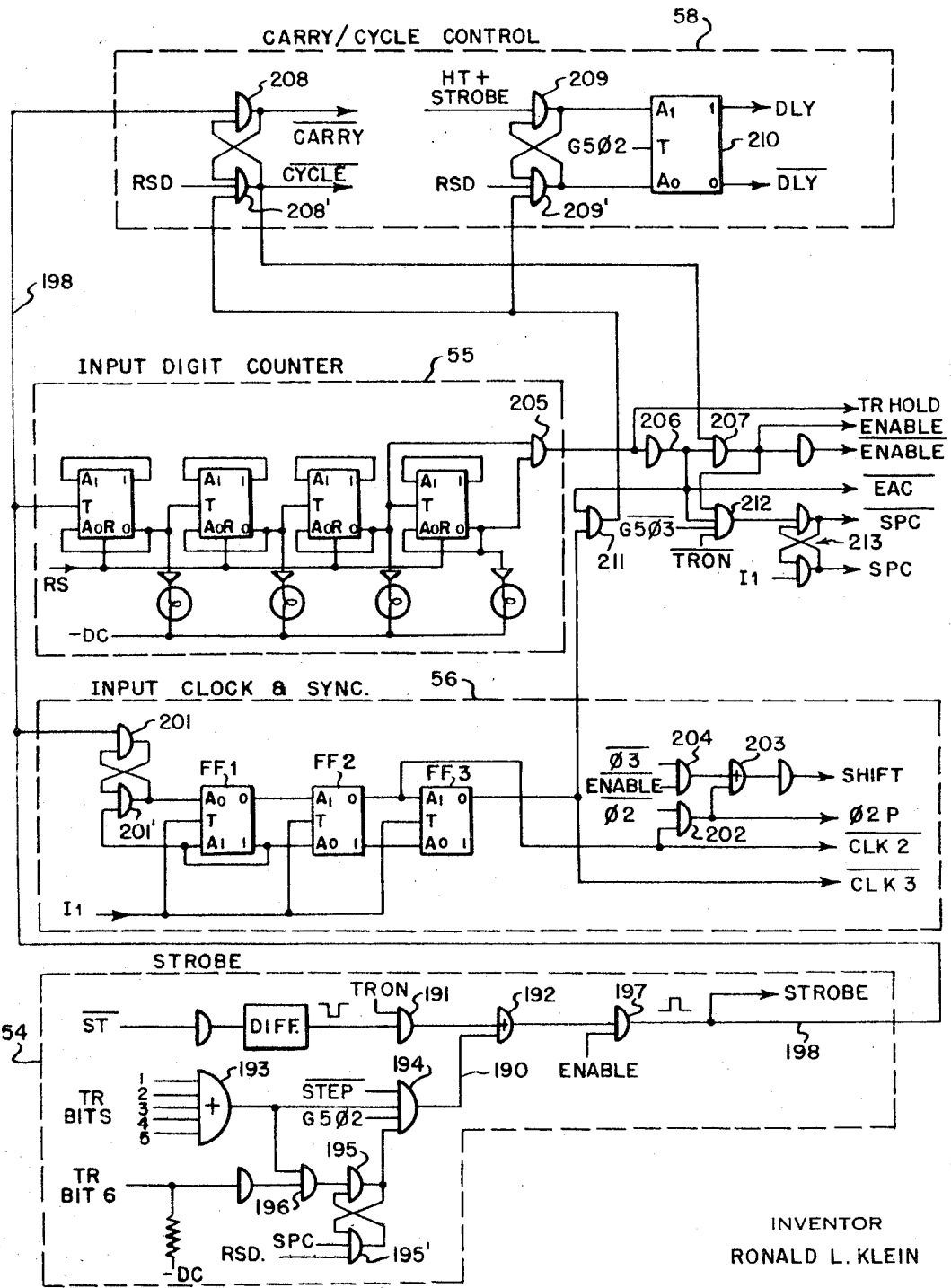

Sept. 2, 1969

R. L. KLEIN 3,465,289

VALIDITY CHECKING SYSTEM

Filed April 19, 1966

INVENTOR
RONALD L. KLEIN

BY
ATTORNEYS

Sept. 2, 1969  R. L. KLEIN  3,465,289
VALIDITY CHECKING SYSTEM
Filed April 19, 1966  20 Sheets-Sheet 13

INVENTOR
RONALD L. KLEIN
BY
ATTORNEYS

Sept. 2, 1969  R. L. KLEIN  3,465,289
VALIDITY CHECKING SYSTEM
Filed April 19, 1966  20 Sheets-Sheet 16

INVENTOR
RONALD L. KLEIN
BY
ATTORNEYS

Sept. 2, 1969  R. L. KLEIN  3,465,289
VALIDITY CHECKING SYSTEM
Filed April 19, 1966  20 Sheets-Sheet 17
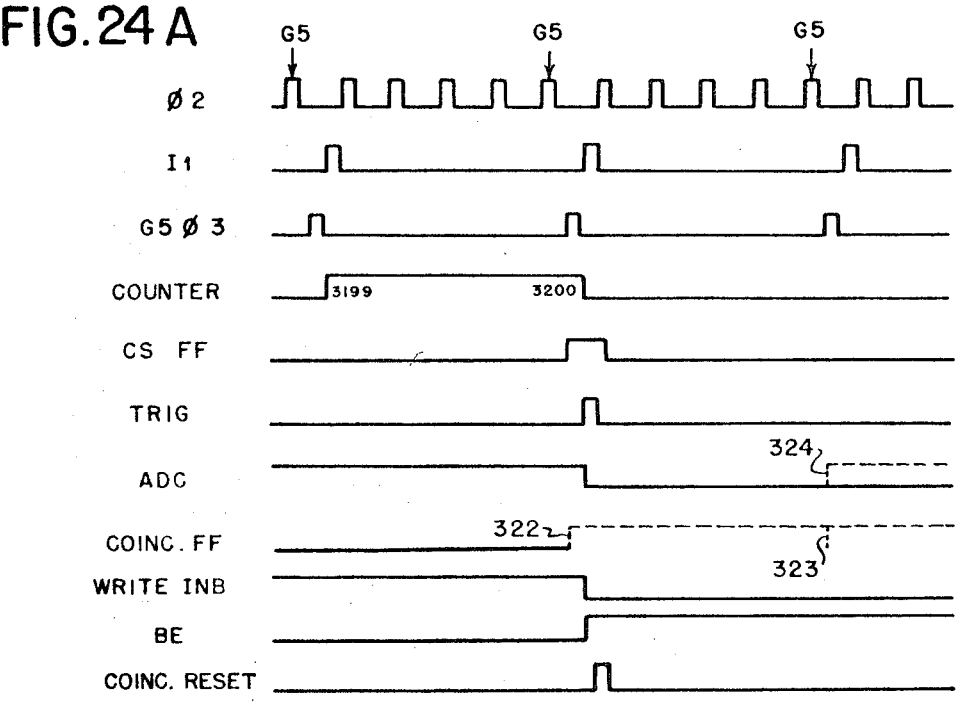
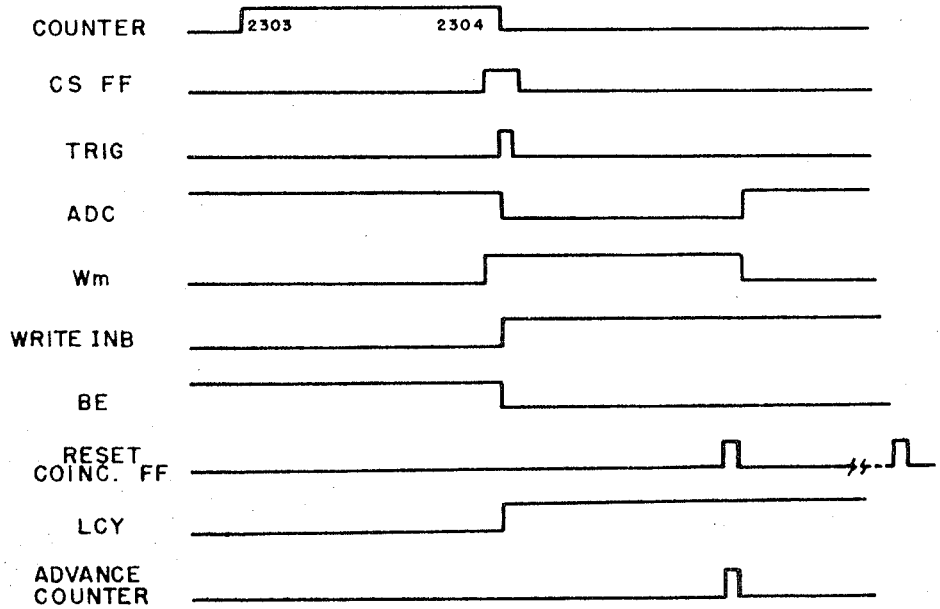
INVENTOR
RONALD L. KLEIN
BY
ATTORNEYS

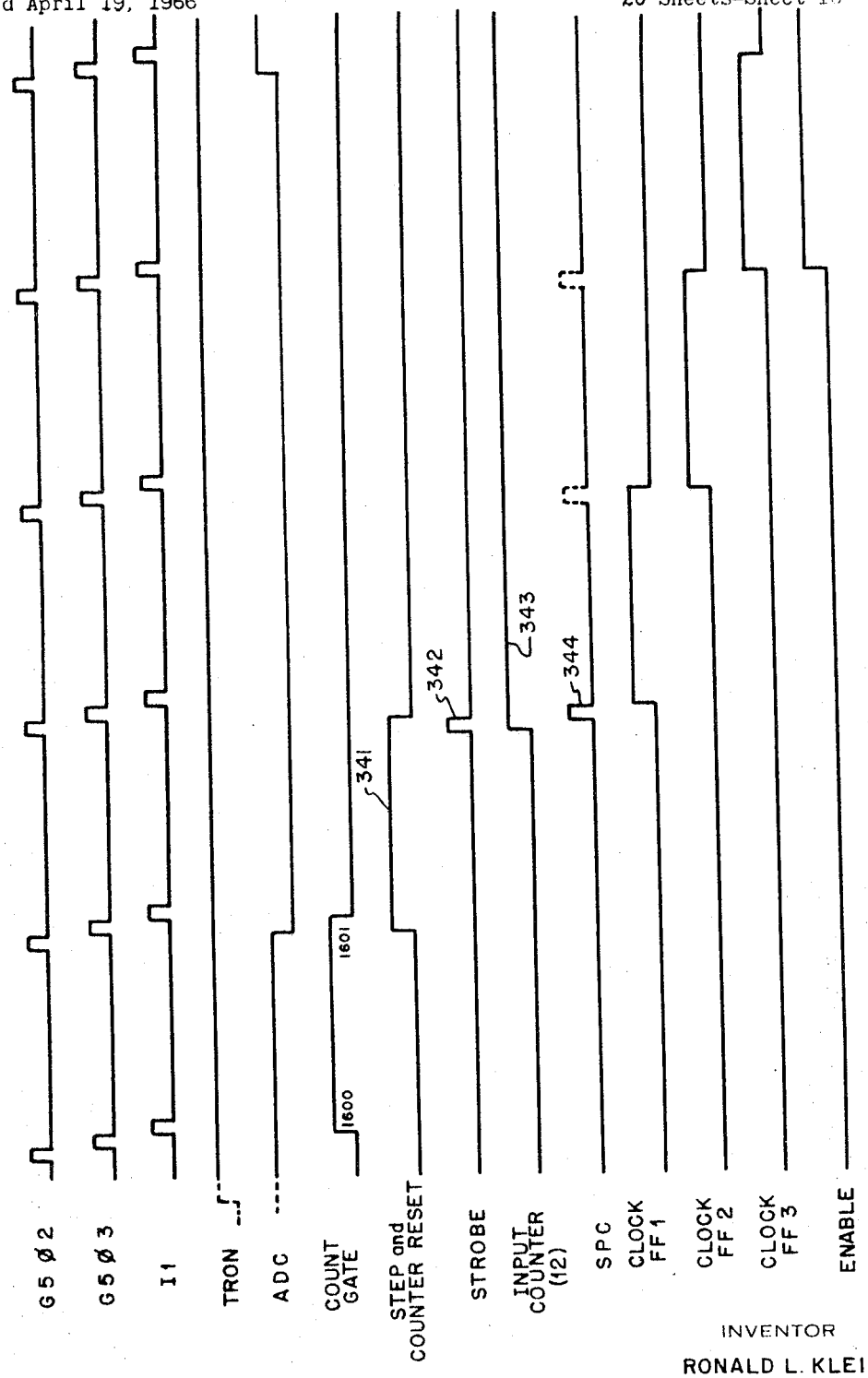

Sept. 2, 1969 R. L. KLEIN 3,465,289
VALIDITY CHECKING SYSTEM
Filed April 19, 1966 20 Sheets-Sheet 19

INVENTOR
RONALD L. KLEIN
BY
ATTORNEYS

Sept. 2, 1969         R. L. KLEIN         3,465,289
VALIDITY CHECKING SYSTEM
Filed April 19, 1966                    20 Sheets-Sheet 20

INVENTOR
RONALD L. KLEIN
BY
ATTORNEYS

United States Patent Office 3,465,289
Patented Sept. 2, 1969

3,465,289
VALIDITY CHECKING SYSTEM
Ronald L. Klein, Philadelphia, Pa., assignor to Ultronic Systems Corp., Pennsauken, N.J., a corporation of Delaware
Filed Apr. 19, 1966, Ser. No. 543,646
Int. Cl. H04q 1/20; G11b 5/00
U.S. Cl. 340—149          21 Claims

ABSTRACT OF THE DISCLOSURE

A system for checking the validity of account numbers on credit cards or the like. Numbers which can be either valid or invalid are stored on a magnetic drum. A plurality of desk mountable interrogation units, remotely located, are connected to a data processor using this drum. Each desk unit is adapted to read the number, send an appropriate message to the processor and receive an answer indicating whether or not the number is valid. This answer is produced by means for comparing the read in number with those contained in the drum to establish the presence or absence of the same number in the drum.

---

This invention relates to a validity checking system for checking numbers which have previously been assigned to users, etc.

The system is particularly useful for checking credit cards near the points of sale, and such a system will be specifically described. It could also be used for other purposes such as checking employees' badge numbers, especially where security is involved. In general, it could be used whenever certain assigned numbers of a group upon occasion become invalid or otherwise unuseable.

At the present time credit cards are in widespread use. Although very convenient, they present serious problems in avoiding further sales to delinquent accounts, in preventing sales to holders of stolen cards, etc. The present invention provides a system for rapidly checking the validity of account numbers such as commonly used on credit cards and the like, and in a convenient and highly reliable manner.

In the system of the invention, account numbers which are either valid or invalid are stored in a cyclic memory such as a magnetic drum. Usually invalid account numbers are stored, since they commonly will be fewer in number. A plurality of interrogating units at locations appropriate to the application are connected to a central processor containing the cyclic memory. In a department store, for example, an interrogating unit can be placed adjacent each cash register so that the sales clerk can readily check all credit purchases. The interrogating units can be sufficiently small for desk or counter use, and hereafter will be called desk units.

Each desk unit has provision for entering an account number read from a credit card, sending a corresponding message to the central processor, and receiving back an answer indicating whether or not the account number is valid. Also, in case an account number is incorrectly entered, or in case of operating difficulties, provision is made to send back an error answer. Preferably the desk units are arranged to store and display an entered number, to clear the entered number upon receipt of a valid or invalid answer, but not to clear when an error answer is received. Thus, in the latter case, the operator can recheck the entered number and, if it is correct, can try again without repeating the entering operation.

The central processor contains a number of features for insuring reliability. This is highly important since erroneous invalid answer will impair customer relationships, an erroneous valid answer will extend credit that is not justified. Also, the central processor contains a number of features promoting economy of construction and operation. A few may be mentioned at this point.

Account numbers may be inserted in, or erased from, the memory by a special desk unit, or by an automatic reader such as a tape reader, card reader, etc. It is important that a given account number be in the memory in only one location. It is also important to be sure that a given insert or erase operation has been successful. Accordingly, three passes of the memory are employed. In the first pass the memory is checked to find out whether the account number to be inserted or erased is in the memory. If present during an insert mode, or if absent in an erase mode, the operation is aborted. Otherwise a second pass is made during which the insert or erase operation is performed. Then a third pass automatically follows to check whether the number is then present or absent. This insures accurate insertion and erasure.

For normal interrogation, two passes of the memory are preferably employed and the results compared. If both passes give the same answer, it is considered correct and sent to the desk unit. Otherwise, an error signal is sent.

Further account numbers in the memory are continuously checked for correct parity, so that any accidental changes in the bits of the digits may immediately be noted and an alarm indication produced.

These features afford reasonable assurance that a valid or invalid answer to an interrogation is correct.

To promote efficiency, account numbers are advantageously stored in the cyclic memory in a plurality of zones, and an account number to be checked is simultaneously compared with the numbers in each of the zones. During an insert mode, blanks in the several zones are determined, and if blanks occur simultaneously in two or more zones provision is made to select one zone for writing to the exclusion of the others. During an erase mode, the zone containing the number to be erased is determined and the erase operation confined thereto. This procedure greatly increases the capacity of the memory while at the same time assuring proper operation.

To avoid the need for precisely synchronizing the operation of the desk units, provision is made to develop strobe pulses from the digits of the account number from each unit when it is operating, and these strobe pulses are used to control the insertion of the digits in an input register. The digits are then counted as they are inserted, advantageously by counting the strobe pulses, to determine that a complete account number has been inserted before comparison with the numbers in the memory begins.

Further, to control insertion and erasure by a reader, separate bit positions of the record medium are allocated to the individual account numbers so that the desired operation can be performed on each number.

These and other features of the invention will in part be pointed out and in part will be understood by those skilled in the art from the following description of a specific embodiment of the invention.

In the drawings:

FIG. 2 shows the 2-out-of-5 code used;

FIG. 3 shows a fragment of coded tape;

FIG. 4 shows a fragment of the storage drum with the coding format employed;

FIG. 6 shows the input coding portions of a desk unit;

FIG. 10 shows the input register and tape reader/desk unit control;

FIGS. 11 and 12 show the generation of the basic timing waveforms;

FIG. 13 shows the read write circuits for the drum heads;

FIGS. 14–16 show various control circuits as designated, and waveforms pertaining thereto;

FIGS. 23–25 show the control counters and associated circuits, and waveforms pertaining thereto;

Figure 27A:
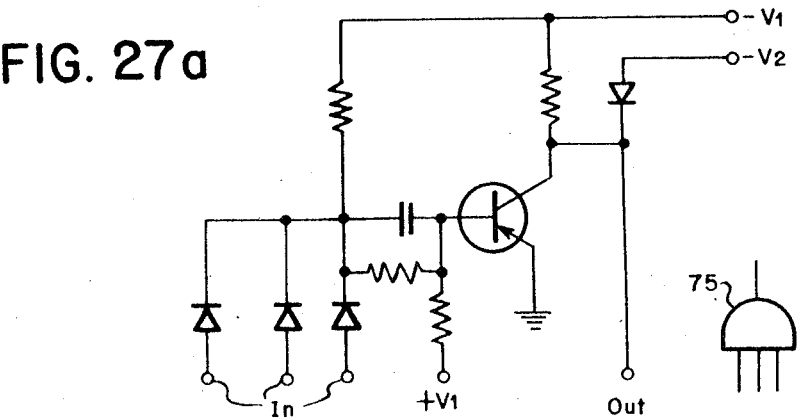

FIGS. 27a, b show illustrative logic units used in preceding figures.

Figure 1:
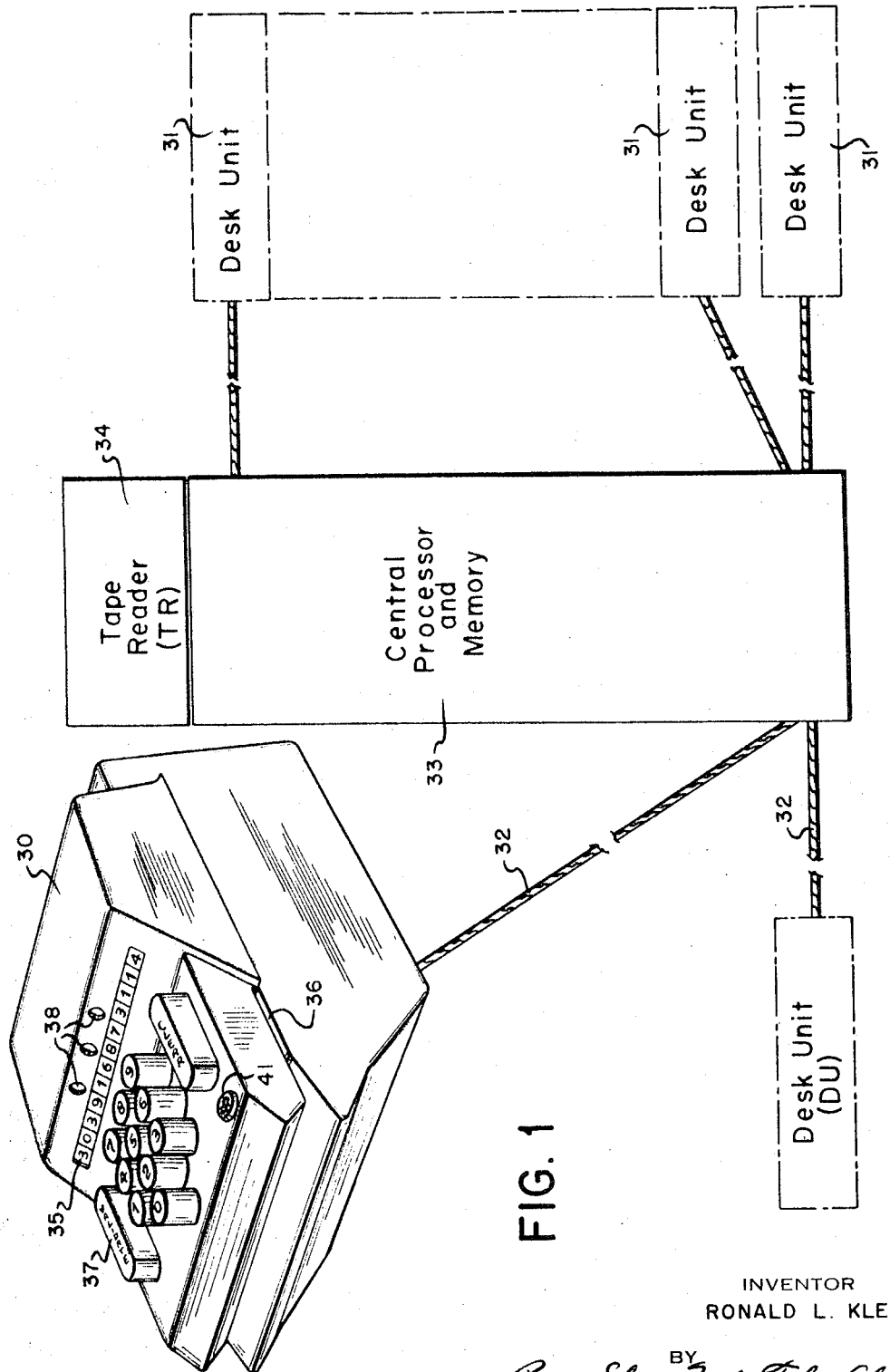
FIG. 1 shows a central processor and memory with a plurality of desk units connected thereto.

Referring to FIG. 1, a plurality of desk units 30 and 31, hereafter denoted D/U, are shown connected by cables 32 to a central processor and memory 33. The latter may include a tape reader 34 (TR) or other device such as a card reader for rapid insertion of delinquent account numbers in the memory, and erasure of numbers no longer delinquent. Selected desk units such as 30 may be provided with Insert/Erase circuits.

DU/30 has a number of push buttons labelled 0 . . . 9 for entering the digits of an account number. As the digits are entered they are displayed in window 35 so that the operator can verify the number before it is used. A sales slip is inserted in slot 36. A Validate button 37 is then pressed to enter the number into the system. Three indicators 38 are provided to indicate respectively that the D/U is in operation, that a reply has been obtained, and that there has been an error. Valid and invalid signals could be displayed by similar indicators. However, in this embodiment if the account is satisfactory (valid) the number is printed on the sales slip. If delinquent or otherwise unsatisfactory, a predetermined character is printed on the slip. If the operator has inserted a wrong number, the clear button 39 may be pressed to reset the desk unit including the display.

A three-position key switch 41 permits Normal, Insert or Erase operations to be selected. It may be omitted in units intended for floor use, and those units wired for only normal operation.

FIG. 2 shows the 2-out-of-5 coding used in this embodiment. The upper row shows the column position in the code. The Weight row gives the weight accorded to each of positions 1–4, so that any digit can be encoded by two 1-bits or less in the proper positions. The parity employed requires two 1-bits per digit, and column 5 is employed for an additional bit when required. The rows designated 1–9, 0 give the bit positions and parity for the corresponding digits.

FIG. 3 illustrates a fragment of punched tape which may be used in a TR. Rows denoted 1, 2, 4, 7 and C correspond to the Weight row in FIG. 2, and the punched holes show the same encoding of digits. The row labelled Spk has sprocket holes for feeding the tape. Two additional rows denoted S.O.M. and E.O.M. are used to indicate the start and end of a message (account number). These are termed 6th and 7th bits, respectively. Accordingly, hole 42 shows the start of one message and hole 43 the end thereof. Hole 42′ indicates the start of the next. For an erasure, a hole 40 is put in the 8th bit track denoted Erase. If the hole is not there, an insertion is intended.

FIG. 4 illustrates a fragment of the surface of a magnetic storage drum used as the memory in this embodiment. The direction of rotation is indicated by the arrow. The drum has parallel tracks with a Read/Write head 44 for each track. The drum surface is divided into a plurality of zones, here shown as six, and each zone has 12 tracks therein for the digits of the account number. With the code here employed, five bit positions are required for each digit, and these are spaced circumferentially in a "Cell." For synchronizing purposes a timing-track $\phi_1$ is provided which yields pulses at the bit rate, and timing track I yields pulses at the cell rate (each 5 bits). With this format a large number of account numbers can be stored. For example, with 16,000 bit positions around the circumference, 19,200 12-digit numbers can be stored in the six zones. With the drum rotating at 1800 r.p.m., only a small access time is required.

Figure 5:
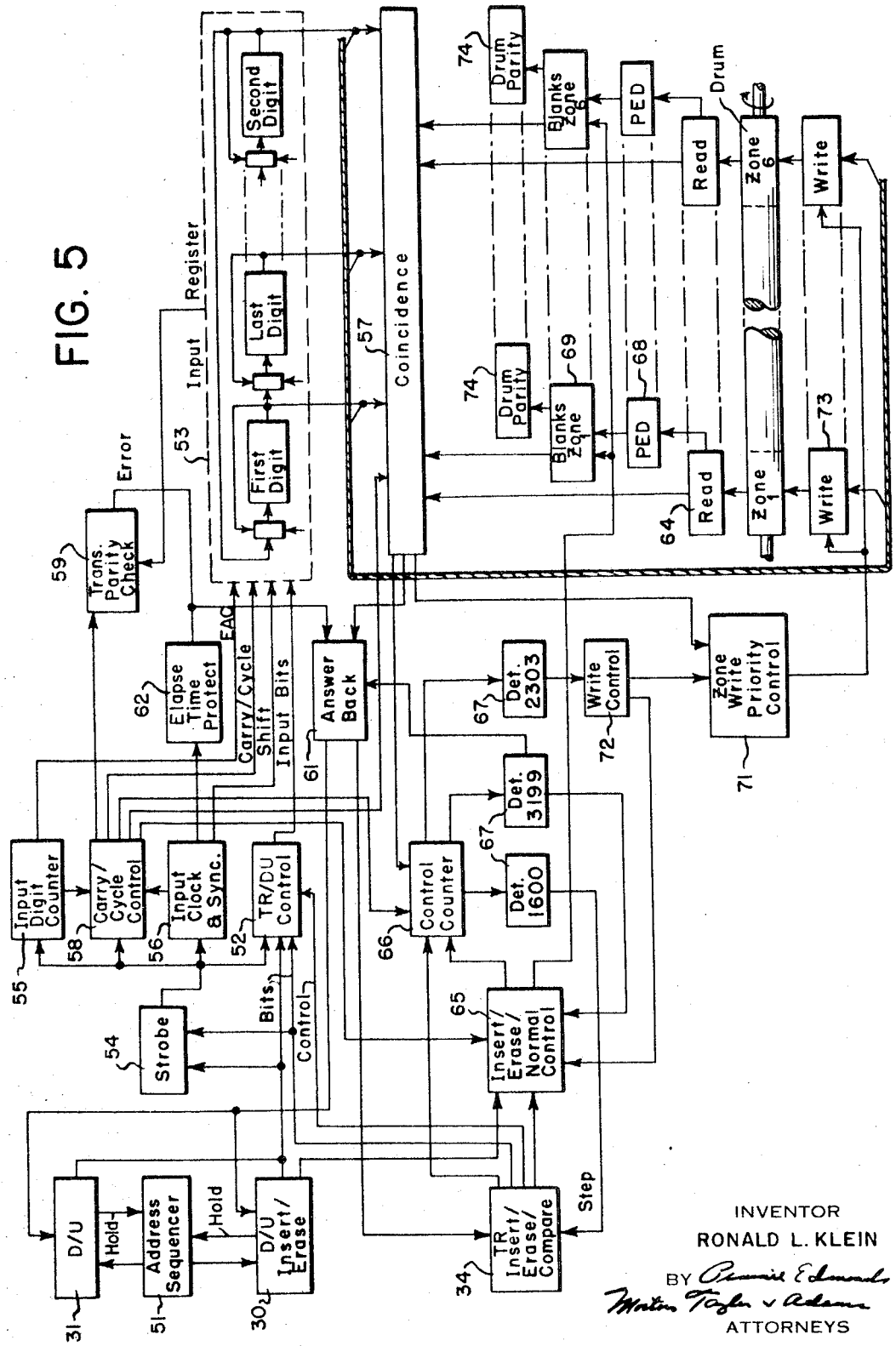
FIG. 5 is an overall block diagram of the system.

FIG. 5 is an overall block diagram of the system. Details have been omitted to avoid undue complexity. Only the broad functioning and interrelationships of the various blocks will be given here, leaving more complete explanation for the subsequent diagrams.

Two D/U's 30 and 31 are shown, the former with provision for inserting and erasing account numbers in the storage unit. They are enabled in sequence by Address Sequencer 51, and whenever a request is ready a hold signal is transmitted to 51 to stop the sequencing until a reply is received. TR34 is also shown.

The account number outputs of the D/U's and the TR are fed through TR/DU control 52 to Input Register 53. The outputs are also supplied to Strobe 54 which produces a strobe pulse for each digit. The strobe pulses are counted in Input Digit Counter 55 to determine when the proper number of digits have been received—twelve in this case. The strobe pulses are also used to set the Input Clock and Sync circuit 56 which generates shift pulses for shifting register 53.

Input register 53 has twelve groups of flip-flops for the twelve digits of an account number, each group having five flip-flops for the bits of each digit. In the so-called Carry mode, the bits of a digit are supplied in parallel to the first group, and then shifted serially to successive groups as new digits arrive. The output of Group 12 is fed back to Group 1, and when all twelve digits have been entered they occupy the positions shown. The stages of each group are then individually recirculated in the so-called Cycle mode and the individual outputs supplied to Coincidence 57 for comparison with the digits in the storage unit. The mode of operation is controlled by the Carry/Cycle Control 58. When the digits of an account number start to arrive, control 58 is set by a strobe pulse from 54 to the Carry mode. When twelve digits have been received and stored, counter 55 changes control 58 to the Cycle mode. Input Clock and Sync 56 maintain proper synchronization.

Transmission Parity Check circuit 59 checks for parity of the digits as they are shifted in register 53 during the Carry mode, and if an error is detected an error signal is delivered to the Answer Back circuit 61. The signal is sent back to the requesting D/U to inform the operator to try again. If the system remains in the Carry mode longer than normally required for the transmission of an account number, Elapse Time Protect circuit 62 functions to deliver a similar error signal back to the requesting D/U.

In normal operation the account numbers stored in the zones of drum 63 are read out by Read circuits 64 and supplied to Coincidence 57 for comparison with the account number in register 53. If coincidence is found, an Invalid signal is supplied by Answer Back 61 to the requesting D/U. If no coincidence is found, a Valid signal is sent back.

Inserting a new delinquent account number on the drum 63, or erasing a number which is no longer deliquet, is under the control of Insert/Erase/Normal control 65 to which signals are supplied from D/U30 or TR34. Control Counter 66 and Count Detectors 67 patricipate in this action.

Inserting a new delinquent acount number on the drum by D/U30 is accomplished in three steps. The new number is first stored in Input Register 53 and the drum examined to determine if the number is already there. If so, the operation is aborted and an Invalid signal returned to the D/U through Answer Back 61. If not, blank spaces are detected by PED circuits 68 and Blank circuits 69 for each zone, and a writing space selected by Zone Write Priority Control 71. The new number is then written on the drum with the aid of Write Control 72 and Write circuits 73. After the writing, the drum is again examined and an Invalid signal returned to D/U30 to assure the operator that the delinquent number has been stored.

Erasing by D/U30 is similar. In the first step the presence of the account number on the drum is determined and, if not, the operation is aborted and a Valid signal sent back. If on the drum, it is erased during the second step. In the third step the drum is again examined and a Valid signal sent back to indicate the erasure has been acomplished.

In the case of the TR, a series of account numbers are inserted by first examining the drum in each instance and then writing the new number on the drum if not already there. A series of numbers are erased by first examining and then erasing. In either case, the correctness of the insertion or erasure may be checked by switching the TR unit to the Compare mode, and again applying the respective series of account numbers. Mixtures of insertions and erasures can be controlled by the 8th bit on the tape.

Finally, since it is important to guard against accidental changes in the acount numbers stored on the drum, the numbers are continuously checked for parity by Drum Parity circuits 74.

The circuit diagrams shown in subsequent figures use digital logic elements. Many types of elements are known in the art and may be used as desired to perform the functions hereinafter described. The specific embodiment here shown uses NOR logic units, examples of which are shown in FIG. 27. These will be described at this point to facilitate understanding the circuit diagrams.

FIG. 27a shows a NOR circuit of known configuration which need not be described in detail. If any one of the three input lines designated "IN" is at ground potential, say corresponding to a binary 1, the transistor will be cut off and the output line designated "OUT" will be negative (binary 0). If all inputs are negative, the transistor will conduct and the output will be at ground potential. For convenience, negative and ground potentials will usually be referred to hereinafter as "low" and "high," respectively. Thus the circuit functions as an AND gate with polarity inversion for input signals whose assertion levels are low, and as an OR circuit with inversion for signals whose assertion levels are high. The symbol 75 is used in the drawings. If only one input line is used, and the others left unconnected, the circuit functions as a polarity inverter.

Figure 27B:
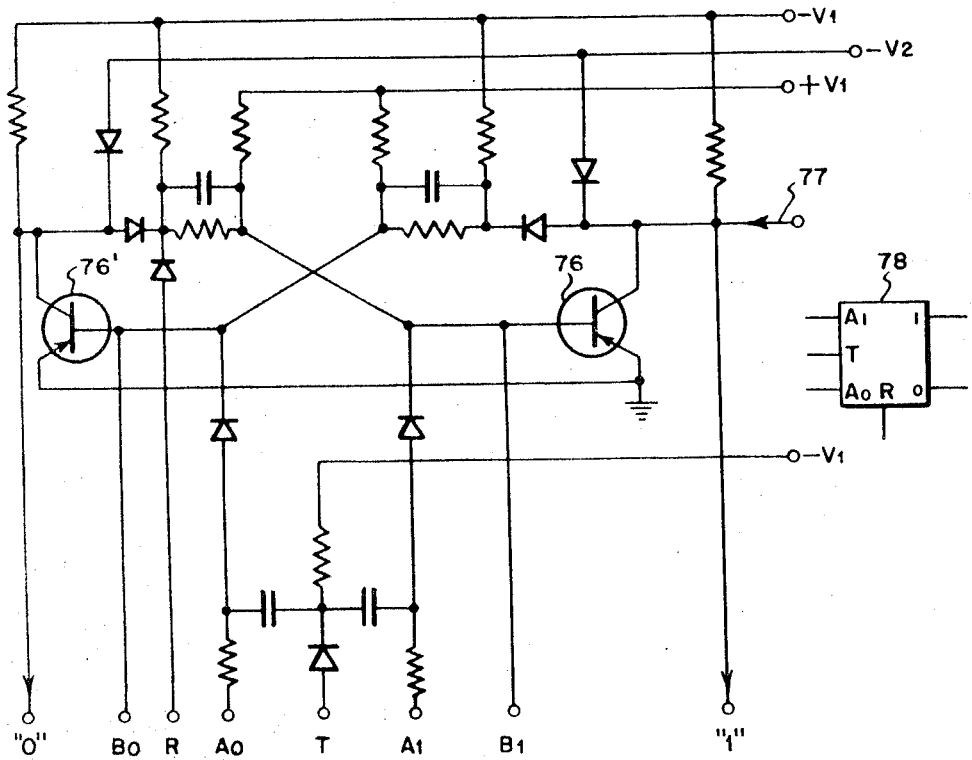

FIG. 27b shows a bistable multivibrator or flip-flop circuit, also of known configuration. The circuit of transistor 76 may be considered the 1-side and that of 76' the 0-side. When 76 is conducting the "1" output is high (ground) and when 76' is conducting the "0" output is high. The reset input R is arranged so that, when it goes high, it cuts off 76. By the cross-connections, 76' is turned on. Thus in the reset state the "0" output is high and the "1" output low. In the set state the conditions are reversed. The flip-flop may be switched from one state to the other by a pulse applied to trigger input T, under the control of steering inputs $A_0$ and $A_1$. If $A_0$ is high and and $A_1$ low, a positive-going trigger pulse at T will cut off transistor 76', thus turning on 76 and producing the set state wherein the "1" output is high. With the input voltages to $A_0$ and $A_1$ reversed, the trigger pulse will cut off transistor 76, thus turning on 76' and producing the reset state wherein the "0" output is high.

Inputs $B_0$ and $B_1$ provide direct connections for forcing the flip-flop to one state or the other. Thus, making $B_0$ high produces the set state, and making $B_1$ high produces the reset state. In addition, an input is shown at 77, which is the same as the "1" output. If the flip-flop is in its 0-state with transistor 76' conducting, a positive signal at 77 will change the flip-flop to its 1-state. Symbol 78 is commonly used in the drawings.

In the detailed drawings a large number of signals are used. Frequently, some signals used in earlier figures are generated in later figures. To facilitate understanding the description, and to avoid excessive reference to other figures for signal sources, a table of the principal signals is given below with their sources and where they are used. The synchronizing signals derived from the drum signals are not included, since they are all developed in FIGS. 11 and 12.

Many signals are shown both unbarred and barred in the drawings, e.g. COINC and $\overline{COINC}$. One is the inverse of the other, and is developed by an inverter, from opposite outputs of a flip-flop, etc. As used, an unbarred signal usually means that its assertion level is high, and a barrel signal that its assertion level is low. In the following table only the unbarred versions will be listed except when only barred signals are used, but the Used column includes figures where the corresponding barred signals are used.

TABLE

| Symbol | Name | Source Figs. | Used in Figs. |
|---|---|---|---|
| ADC | Arm Digit Counter | 23 | 18, 23 |
| BE | Blank Enable | 18 | 20, 21 |
| $\overline{CARRY}$ | Carry mode | 14 | 10, 17 |
| $\overline{CLK\ 2}$ | Clock 2 | 14 | 14, 17 |
| $\overline{CLK\ 3}$ | Clock 3 | 14 | 17 |
| COINC | Coincidence | 23 | 9, 18, 20 |
| $\overline{CS}$ | Count Set | 23 | 18, 23 |
| $\overline{CYCLE}$ | Cycle mode | 14 | 10 |
| DLY | Delay | 14 | 9, 17 |
| $\overline{DNI}$ | Drum Numeric Input | 10 | 13 |
| DNO | Drum Numeric Output | 13 | 20 |
| $\overline{DUOL}$ | Desk Unit on Line | 8 | 10 |
| $\overline{EAC}$ | End Around Carry | 14 | 10 |
| ELAPSE TIME | | 17 | 17 |
| ENABLE | | 14 | 14, 23 |
| ERASE | | 7, 18, 19 | 9, 17, 18 |
| ERROR | | 17 | 6, 7, 9, 10, 23 |
| HOLD | | 7 | 8 |
| HT | Hold Trigger | 8 | 17 |
| IBR | Input Buffer Register | 10 | 17, 20 |
| INSERT | | 7, 18, 19 | 9, 18 |
| $\overline{INVALID}$ | | 9 | 6, 7, 10, 17 |
| LCY | Last Cycle | 23 | 9, 23 |
| PED | Parity Error Digit | 13 | 21 |
| $\emptyset_2 P$ | $\emptyset_2$ Pulse | 14 | 17 |
| RS | Reset | 9 | 10, 14, 23 |
| RS' | Reset' | 9, 23 | 23 |
| RSD | Reset Delay | 9 | 8, 14, 17, 19, 23 |
| SEC ER | Second Pass Error | 23 | 17 |
| $\overline{SEND}$ | | 9 | 8, 10, 19 |
| SET | | 20 | 20 |
| SHIFT | | 14 | 10 |
| SPC | Stop Counter | 14 | 9, 14, 17 |
| SPTR | Stop Tape Reader | 19 | 23 |
| ST | Strobe Trigger | 10 | 14 |
| $\overline{STEP}$ | | 23 | 14 |
| STB | Store Blanks | 18 | 9, 10, 20 |
| STROBE | | 14 | 10, 17, 19 |
| TR HOLD | Tape Reader Hold | 14 | 23 |
| TRCK | Tape Reader Check | 9 | 17 |
| TRIG | Trigger | 18 | 9, 23 |
| TRDN | Tape Reader On | 19 | 10, 14, 18, 19 |
| $\overline{VALID}$ | | 9 | 6, 7, 10, 17 |
| $\overline{WE}$ | Write Enable | 22 | 13 |
| Wm | Write mark | 23 | 9, 18, 22, 23 |
| WP | Write Pulse | 11 | 13, 20 |
| WRITE INB | Write Inhibit | 18 | 23 |
| $\overline{Z}$ Blank | Zone Blank | 21 | 20 |
| Zone | | 20 | 22, 23 |

Figure 7:
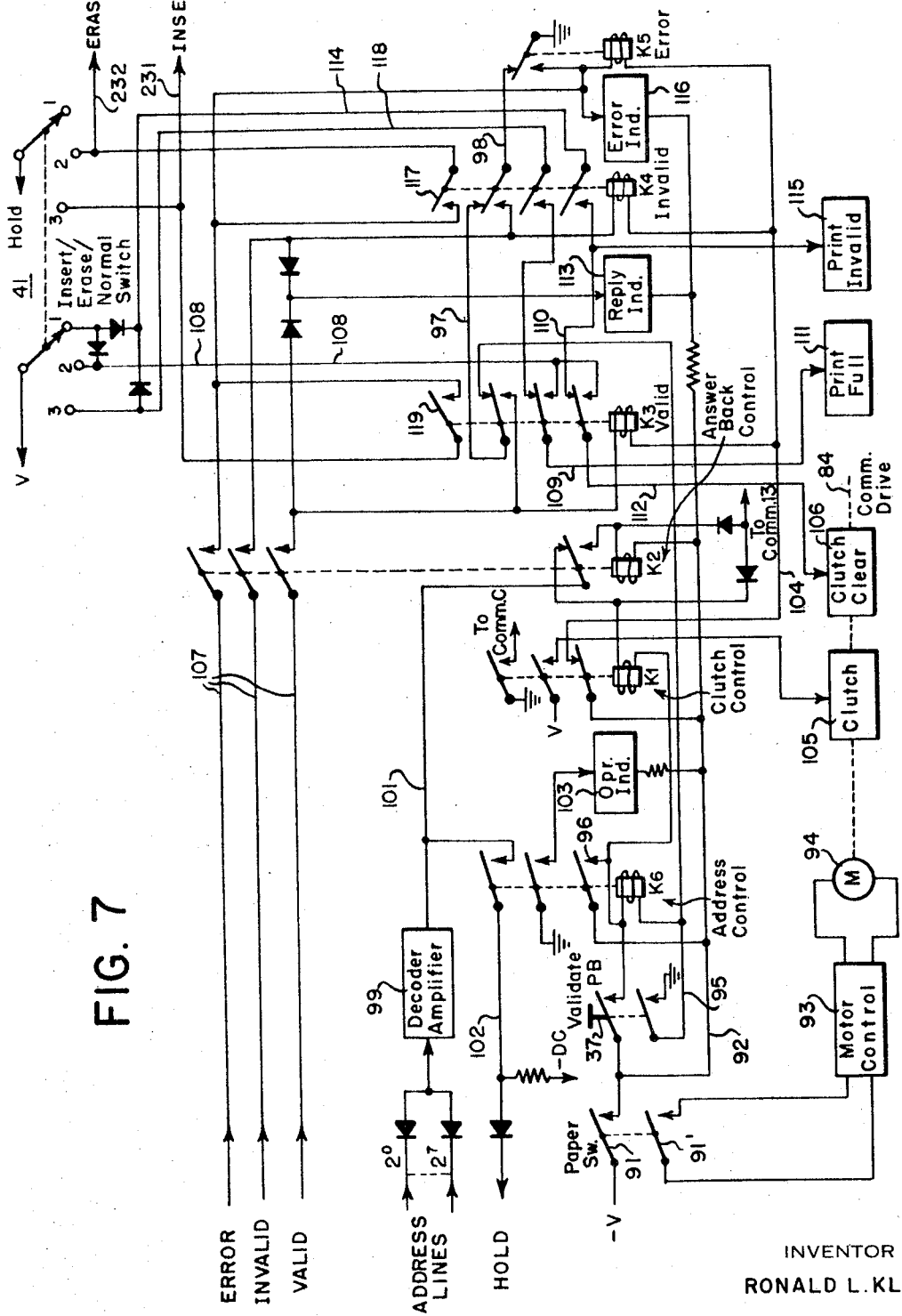
FIG. 7 shows the control portions of a desk unit.

Considering now the individual blocks of FIG. 5 in more detail, FIGS. 6 and 7 show the circuitry of a D/U with Insert/Erase facilities. Referring to FIG. 6, digit switches 81 are provided, equal in number to the digits of an account number—twelve in this case. The switch blades 81' are arranged to be moved in succession in the direction of the arrows by digit pushbuttons (FIG. 1) through suitable mechanism (not shown). In the initial position a blade engages contact B, and when moved will engage one of contacts 1–9, 0 depending on the pushbutton actuated. As each blade is moved, it rotates a digit indicator 82 which displays the selected digit in window 35 (FIG. 1).

The blades of the switches are connected to respective contacts of commutator 83. Any suitable type of commutator may be employed, but it is here shown as a switch similar to the digit switches. The blade 83' of the commutator is driven by a motor and clutch arrangement (FIG. 7) through a suitable drive indicated by dash line 84. When driven, the blade 83' is grounded through contact Comm C, as will be explained. The commutator will thus ground the blades of digit switches 81 in succession, and will end at switch contact 13 denoted Comm 13. The order of commutating is least significant figure first.

Like contacts of the digit switches are connected together, and then to a matrix comprising diodes and five lines 86 which convert the digits to the 2-out-of-5 code of FIG. 2. Lines 86 are normally held negative by a D-C source through series resistors, and are connected through diodes 87 to the Output Bit lines 1–5. The contacts of the digit switches ground the lines 86 in various coding combinations to deliver corresponding high signals to the output lines. As an example of the encoding, contact 1 of each digit switch is connected to Output Bit lines 1 and 5, agreeing with FIG. 2. If any digit switch is not actuated, contact B thereof will connect to Bit lines 1, 2, 4 and 5. This is not a valid coding and will return an Error signal to the D/U.

Answer back signals Error, Valid and Invalid are returned to the D/U via Bit lines 5, 4 and 3, as indicated.

Referring to FIG. 7, when a sales slip is inserted in slot 36 of the D/U (FIG. 1), the Paper Switch 91, 91' is closed. This supplies —V to line 92, and also actuates the Motor Control 93 to start motor 94. When the operator has entered the account number, he presses the Validate pushbutton 37, thereby supplying —V to actuate relay K6 and also grounding line 95. A lockup circuit is established for K6 through its contact 96 to line 92 (—V), and through line 95, the normally closed contacts of relays K3 and K4 connected by line 97, and thence through line 98 and the normally closed contact of relay K5 to ground. Contact 96 also supplies —V from line 92 to relay K1.

Binary-coded Address Lines from the Address Sequencer (FIG. 8) are supplied to Decoder Amplifier 99. Each D/U has its decoder amplifier wired to recognize a different binary coded number and, when it is received, causes line 101 to go high. Line 102 is normally held negative by the —DC source but, when line 101 goes high and K6 is actuated, a high HOLD signal is developed which is returned to the sequencer to stop the counter therein. Actuation of K6 also actuates Opr. Ind. 103 to indicate that the D/U is in use.

The high level in line 101 is supplied through the normally closed contact of relay K2 to actuate K1. Actuation of K1 disconnects —V in line 92 from line 104 leading to relays K3, K4, K5 and prevents their actuation. K1 also grounds contact Comm C of the Commutator 83 (FIG. 6) and supplies voltage V to clutch 105 which drives the commutator from positions 1 through 13 and back. This causes the coded account number to be transmitted to the central processor. When the commutator reaches position 13, line Comm 13 is grounded. This actuates relay K2 and a lock-up circuit is established by connecting line 101 to the relay coil. The energizing circuit from line 101 to relay K1 is broken, but a temporary hold-over is obtained from Comm 13 to enable the clutch to complete its drive. K1 is then deenergized, thereby disengaging clutch 105 and applying —V from line 92 to line 104. Actuation of K2 closes the relay switches in the answer back lines 107.

If the answer is Valid, relay K3 is energized. With switch 41 in the Normal position shown, voltage V is supplied through lines 108 and 109 to actuate Print Full 111, thereby printing the account number on the sales slip. Also, V is applied through line 112 to Clutch Clear 106 which is arranged to return the digit switches 81 (FIG. 6) to their initial positions. A VALID signal will also energize Reply Indicator 113.

If the answer is Invalid, relay K4 will be actuated and supply V from line 114 to Print Invalid 115, thereby printing an arbitrary mark on the sales slip. Reply indicator 113 and Clutch Clear 106 will also be energized, the latter through line and the closed contacts of K3 to line 112.

If the answer is Error, relay K5 and Error Indicator 116 will be actuated. However, it will not print or clear the number from the D/U.

Actuation of any of relays K3, K4, K5 will break the hold circuit for relay K6. This in turn will cause HOLD to go low and break the hold circuit for the sequencer, allowing another D/U to transmit. If an Error reply has been received, the operator may check the account number displayed in window 35 and again press Validate button 37.

To erase a number from the storage drum in the central processor, key switch 41 is moved to position 2. A slip of paper may be inserted in slot 36 of the D/U (FIG. 1), the account number entered, and the Validate button 37 depressed. When the D/U is addressed by the Sequencer, HOLD goes high, relays K6, K1 and K2 operate as before, and the account number is sent to the central processor. The high HOLD at switch 41 makes ERASE high to effect erasure as described later. After erasure, the drum will be re-examined and an answer returned to the D/U. If the answer is Valid, indicating the number has been erased, Reply Indicator 113 will be actuated and K3 will operate as before to print out the number and clear the D/U. If the answer is Invalid, the Reply Indicator 113 and relay K4 will be energized. The setting of switch 41 to position 2 will have removed V from line 114 so that Print Invalid 115 will not operate nor will Clutch Clear 106. However, closure of switch 117 will make the Error line high to actuate K5, and also energize Error Indicator 116 to indicate the number was not erased. Relay K6 will be de-energized to release the D/U from the line. The operator can try again to erase the number by again depressing the Validate button. If the original answer is Error, operation will be the same as in the Normal mode.

To insert a number on the drum, key switch 41 is moved to position 3. When HOLD is established the Insert line goes high to effect insertion as described later. Procedure is as in the Erase mode, and an answer will be returned to the D/U. If Invalid, indicating insertion has been accomplished, Reply Indicator 113 and relay K4 will be energized. Both line 114 and line 118 will have V applied thereto by switch 41, and hence both Print Full 111 and Print Invalid 115 will be actuated to print the account number and the invalid symbol on the slip of paper. The D/U will also be cleared. If the answer is Valid, Reply Indicator 113 and relay K3 will be energized. Closure of switch 119 by K3 will make the Error line high and energize Error Indicator 116 to indicate the number was not inserted. Line 108 will not have V applied thereto, so Print Full 111 will not operate nor will Clutch Clear 106. However, K6 will be de-energized to release the D/U from the line and the operator can again depress the Validate button. If the answer is Error, operation is as in the Normal mode.

Figure 8:
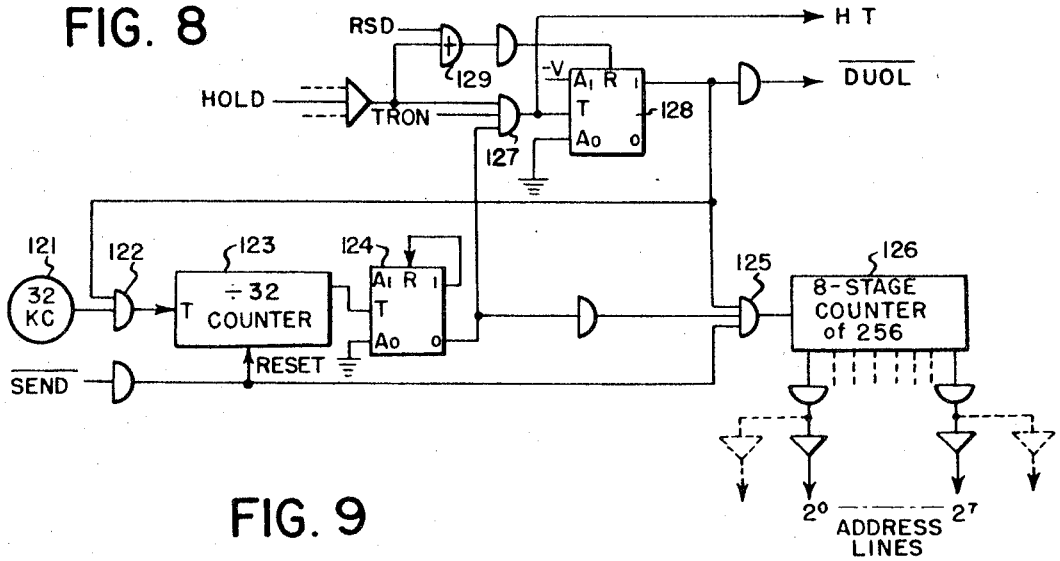
FIG. 8 shows the desk unit address sequencer.

Referring to FIG. 8, the Address Sequencer is shown. The output of a 32 kc. pulse generator 121 is supplied through gate 122 to a ÷32 counter 123, yielding a 1 kc. pulse output. Each pulse sets FF124, and it will reset itself after a brief interval by the connection from its 1-output to R. The 0-output is inverted and supplied through gate 125 to an 8-stage counter 126. Output lines are taken from each stage of the counter and inverted and amplified to form the $2^0$ . . . $2^7$ address lines. A set of address lines connects to each D/U. The maximum count of 256 allows that number of D/U's to be used in the system, each D/U being assigned an individual count which it decodes.

The 0-output of FF124 is also supplied through gate 127 to FF128. Assuming FF128 is in its reset state, its low 1-output to gate 122 allows counting to proceed. When a given D/U is ready for transmission and its Validate button pressed, it sends a HOLD signal which is amplified (with inversion) and supplied to gate 127 to enable the gate. TRON will be low if the tape reader is off. When FF124 next becomes set, its 0-output passes through gate 127 to set FF128. The consequent high 1-output inhibits gates 122 and 125 to prevent further counting and sequencing. When an answer has been sent back, a high RSD signal is developed (FIG. 9) which is supplied to OR129 and inverted to reset FF128 and allow sequencing to proceed.

TRON is applied to gate 127 to inhibit setting of FF128 when the tape reader is on. The output of gate 127 develops the HT signal, and the 1-output of FF128 is inverted to yield $\overline{DUOL}$, which is low when a D/U is on the line (in service). When an answer back signal has been produced, a negative pulse $\overline{SEND}$ is developed which is inverted and used to reset counter 123. It also inhibits gate 125 momentarily to prevent stepping counter 126 prematurely.

If, due to faulty operation, a D/U breaks its hold circuit before an answer back, HOLD will go low and the high output of its amplifier to OR129 will reset FF128 and allow sequencing to proceed even though RSD has not been developed.

Figure 9:
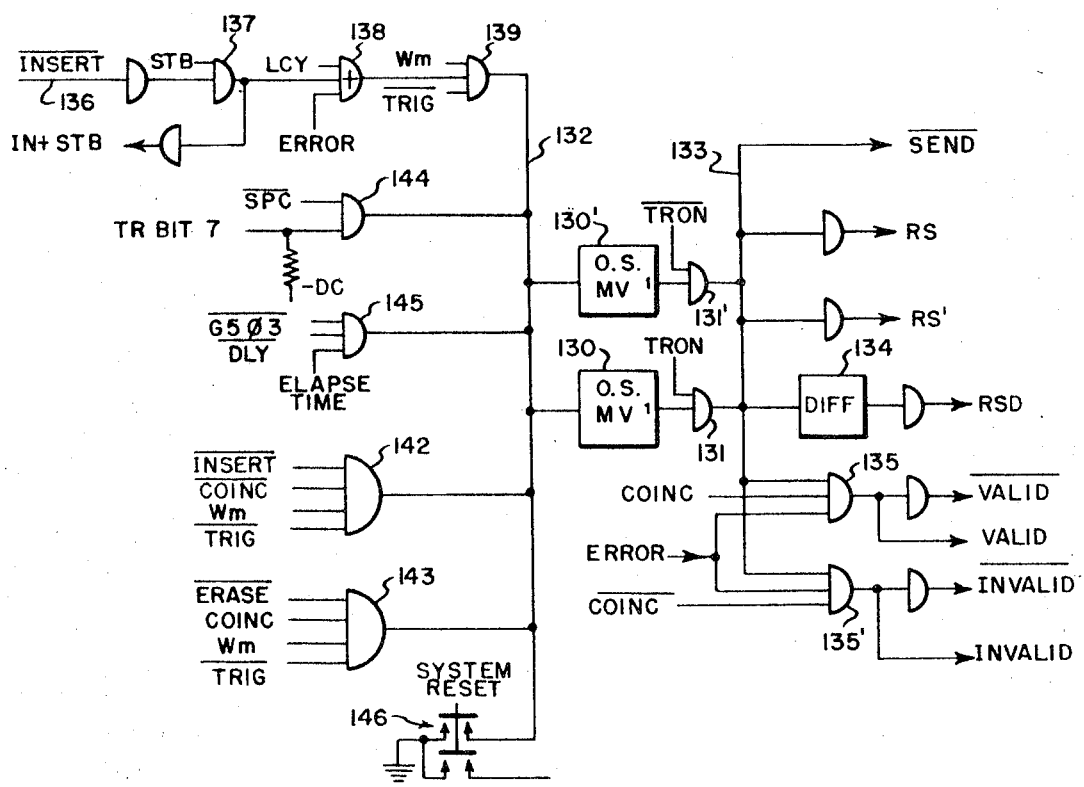
FIG. 9 shows the answer back portion of the system.

FIG. 9 shows the Answer Back circuitry. Line 132 is normally low and line 133 high. When an answer is ready, line 132 goes high. A one-shot multivibrator 130 develops an answer back pulse for a D/U. It is triggered when line 132 goes high, and its 1-output goes high. This is inverted by gate 131 to make line 133 low. MV130 resets after an interval determined by its time constant, making line 133 high and giving an appropriate length of pulse for the D/U answer back circuits. A second MV130' having a shorter reset time is provided for TR operation, so that the answers back are shorter and speed up the overall TR operation. TRON and $\overline{TRON}$ are supplied to gates 131, 131' so that they operate alternatively. A negative $\overline{SEND}$ signal is developed and, through inverters, positive RS and RS' signals. The answer pulse is also differentiated in 134 and inverted to form a positive RSD signal at the trailing edge of the answer pulse, thus introducing a delay so that answers back can be completed before resetting functions performed by RSD take place, e.g., as in FIG. 8. If there is no error, ERROR will be low and one or the other of gates 135, 135' will pass the answer pulse depending on whether COINC or $\overline{COINC}$ is low. The outputs of the gates are inverted to form $\overline{VALID}$ or $\overline{INVALID}$, respectively. The output of gate 135' also forms TRCK used in TR checking.

Considering the inputs to line 132, during a Normal operation by a D/U $\overline{INSERT}$ in line 136 will be high, and is inverted and applied to gate 137. STB will be low, and the high output of 137 is applied to OR 138. The output of gate 137 is also inverted to form $IN+STB$. The resultant low output of OR 138 goes to gate 139. W$m$ will be low since no writing is involved. Two passes on the drum are used during Normal operation, and coincidence determined in each pass, to make sure that extraneous signals will not give a wrong answer. $\overline{TRIG}$ will go low after the second pass, thus making line 132 high to develop the answer back pulse in line 133. If ERROR is high, it will inhibit gates 135, 135' since this signal is sent back from FIG. 17. If there is no error, and the number is not found on the drum, COINC will be low and $\overline{VALID}$ developed. If the number is found on the drum, $\overline{COINC}$ will be low and $\overline{INVALID}$ developed.

For an insertion, gate 142 applies. $\overline{INSERT}$ will be low. As stated above, three passes on the drum are involved. W$m$ is low except when the number is being written in a cell of the drum at the end of the second pass. $\overline{TRIG}$ is a negative pulse at the end of each pass. Accordingly, if the number to be inserted is already on the drum, at the end of the first pass $\overline{COINC}$ will be low, line 132 will go high, and $\overline{INVALID}$ developed, thus aborting passes two and three. $\overline{COINC}$ will also be low after the third pass if the number has been inserted, and $\overline{INVALID}$ developed. If the number has not been inserted, gate 142 will not open. However, during the third pass LCY will be high at the input of OR138, forcing an abort at $\overline{TRIG}$ time. At this time COINC will be low at gate 135, yielding $\overline{VALID}$.

In case of an error, ERROR to OR138 will force an answer back at the end of the first pass when $\overline{TRIG}$ occurs.

For an erasure, gate 143 applies and the action is similar to insertion. If initially the number to be erased is not on the drum, COINC will be low during the first pass yielding $\overline{VALID}$. If not on the drum after the third pass, $\overline{VALID}$ will also result. If on the drum after the third pass, $\overline{INVALID}$ will result.

Figure 17:
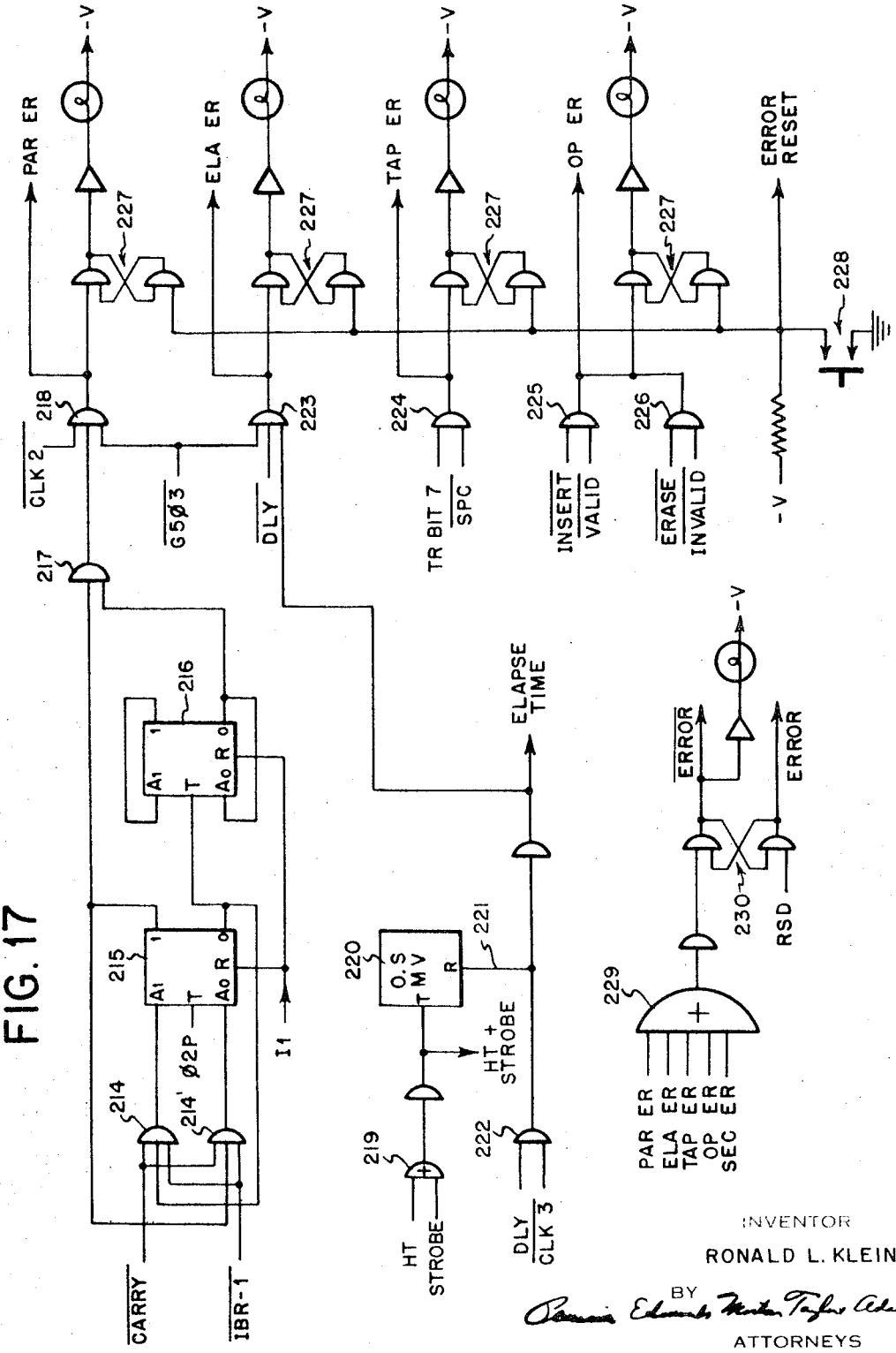
FIG. 17 shows transmission parity check, elapse time and lamp indicator circuits.

If the TR is in operation, it is possible for an out-of-synchronization condition to develop. Gate 144 protects against this. $\overline{SPC}$ is low after a count of 12 digits. TR Bit 7 should be high at this time, since it is the end of the message (E.O.M.) If not, the output of gate 144 goes high and triggers MV 130' to abort the operation. An ERROR signal will be returned to the TR (FIG. 17).

Gate 145 protects against a failure to transmit 12 digits in a predetermined length of time. If this occurs, ELAPSE TIME goes low. $\overline{DLY}$ will be low, and G5Ø3 will pass through the gate to make line 132 high and abort the operation.

Finally, a System Reset switch 146 may be manually actuated to abort the operation.

Referring now to FIG. 10, TR/DU control 52 is shown by the lower box. The development of the strobe trigger signal $\overline{ST}$ for each input digit will first be described. Output Bits from the D/U (FIG. 6) are supplied through inverting amplifiers to inverters 147 whose outputs are supplied in parallel to line 148. Whenever a digit of an account number is transmitted, line 148 will go high. This is inverted and supplied to gate 149. The positive output of gate 148 is differentiated in 151 to yield a negative spike corresponding to the leading edge of the bit. The spike is inverted by gate 152 and triggers a one-shot MV153. The 1-output first goes high and then low upon reset, and the reset time constant is selected to give a negative $\overline{ST}$ beginning at approximately the middle of a bit interval. The trailing edge of the inverted pulse at its 0-output triggers a second one-shot MV154 whose 1-output is supplied to gate 149 to inhibit the gate until near the beginning of the next bit interval. In this manner erratic generation of $\overline{ST}$ due to bouncing of the contacts of the commutator 83 used to generate the digit bits (FIG. 6), and possible faulty operation due to noise, are avoided.

$\overline{\text{DUOL}}$ is low when a D/U is on the line and enables gate 152; otherwise it is high to prevent accidental generation of $\overline{\text{ST}}$ when not required for a D/U. Reset signal RS inhibits gate 152 to prevent generating $\overline{\text{ST}}$ during answer back.

The account number bits from the DU are also applied to gates 155. STROBE pulses derived from $\overline{\text{ST}}$ (FIG. 14) are inverted and applied to the gates. When the TR is off, TRON is low and enables the gates. Accordingly, as the bits of successive digits arrive they are gated in parallel to the five stages of Group 1 of the Input Register 53 and set the stages to the corresponding bit combinations. These stages are connected as a shift register which is shifted by pulses in line 156 occurring at drum cell rate, much higher than the D/U bit rate. Five SHIFT pulses are produced after each STROBE pulse, as will be explained. The 0-output of Group 1 is fed back to gate 157 at the input. In the Cycle mode, gate 157 is enabled by $\overline{\text{CYCLE}}$ and the bits in the Group recirculate.

In the Carry mode, the 0-output of Group 1 is supplied through gate 158, enabled by $\overline{\text{CARRY}}$, to Group 2 which is the same as Group 1 except that there are no parallel digit bit inputs. Successive Groups 3–12 are the same as Group 2. Thus as successive digits are inserted in Group 1, they are shifted to successive Groups 2–12. The output of Group 12 is fed back through line 159 to gate 161 at the input of Group 1. $\overline{\text{EAC}}$ is low when 12 digits have been counted, and allows the digit in Group 12 to pass into Group 1. This will be the first digit entered, as indicated in parentheses. Digit 12 will be in Group 2, digit 11 in Group 3, etc.

The complete account number is now in the register, and the cycle mode is produced by $\overline{\text{CYCLE}}$ going low and $\overline{\text{CARRY}}$ high. Thus the digit bits in each group are recirculated. The 1- and 0-outputs of Group 1 are inverted to form $\overline{\text{IBR-1}}$ and IBR-1, respectively. The outputs of Group 2 form $\overline{\text{IBR-12}}$ and IBR-12, and similarly for the other groups. The 0-output of Group 1 is also fed to gate 162 which, when STB is low, produces $\overline{\text{DNI-1}}$. Group 2 produces $\overline{\text{DNI-12}}$, and similarly for the other groups. The $\overline{\text{DNI}}$ signals are used to write on the drum during an insert mode. As will be observed, this is accomplished without destroying the contents of the register, so that a subsequent check on proper insertion can be made. During an erase mode, STB is high and forces the $\overline{\text{DNI}}$ signals high to store 0-bits on the drum, thus erasing.

Returning to the TR/DU control portion of FIG. 10, when the tape reader is in service bits are supplied through inverters 163 to gates 164. Inverters 163 are biased negatively by —DC, similarly to the bit lines 86 of the D/U (FIG. 6). When the TR is on, $\overline{\text{TRON}}$ is low and enables gates 164. Strobe pulses STROBE are developed from the TR digit bits (FIG. 14) and the digit bits are supplied to the Input Register in the same manner as described for the D/U.

To return an answer to a D/U, use is made of the bit lines 3, 4 and 5. Gated amplifiers 165 are employed. With the TR off, TRON is low and $\overline{\text{INVALID}}$ supplies an invalid signal to line 3. Similarly, $\overline{\text{VALID}}$ supplies a valid signal to line 4. $\overline{\text{ERROR}}$ and $\overline{\text{SEND}}$ participate in supplying an error signal to line 5.

Figure 12:
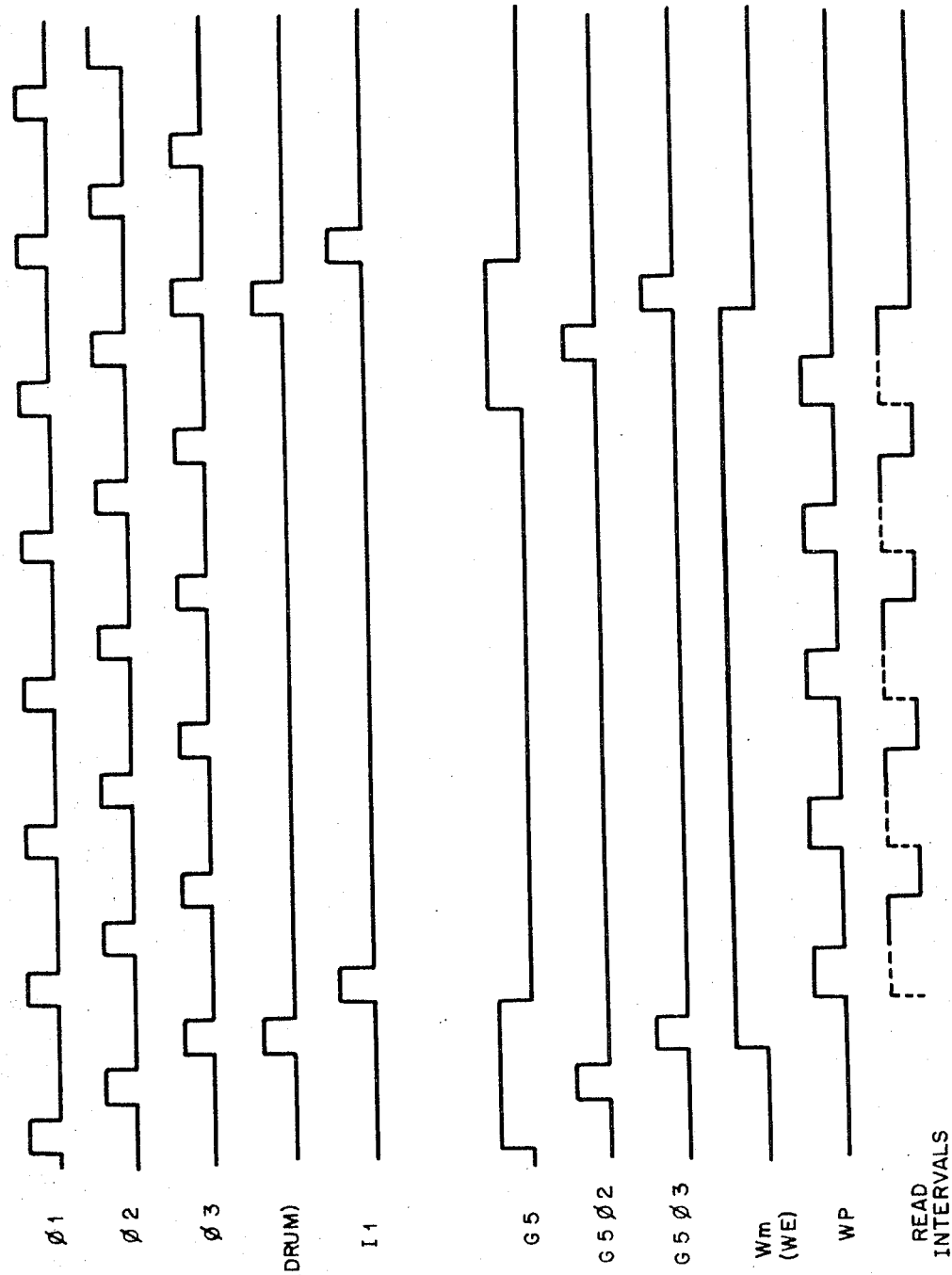

Referring now to FIGS. 11 and 12, the generation of synchronizing signals used widely in the system is shown. The $\emptyset 1$ drum track has 1-bits for each bit interval (FIG. 4), and these are supplied to line 171. One inversion yield $\emptyset 1$ and two inversions yield $\overline{\emptyset 1}$. The bits in line 171 are successively delayed in 172, 172' to yield $\overline{\emptyset 2}$, $\emptyset 2$ and $\overline{\emptyset 3}$, $\emptyset 3$. The time relationships are shown in FIG. 12.

The I sync signals for each cell of five bits are actually written on the drum at the $\emptyset 3$ preceding the $\emptyset 1$ for the respective cell. For sync purposes in the system, an $I_1$ signal is developed which coincides with $\emptyset 1$. At the upper part of FIG. 11 the I drum pulses are applied to set FF173 which is reset by the next $\emptyset 2$ pulse. The output is applied to gate 174 which is triggered by $\overline{\emptyset 1}$ to yield $I_1$, and inverted to yield $\overline{I_1}$. The result is shown in FIG. 12.

Writing bits on the drum takes place between the beginning of $\emptyset 1$ and that of $\emptyset 2$. These signals are used to set and reset FF175. A single inversion of the output yields WP and a double inversion $\overline{\text{WP}}$.

Some portions of the system require pulses recurring at cell rate, but phased at $\emptyset 2$ or $\emptyset 3$ rather than $\emptyset 1$. At the bottom of FIG. 11, FF's 176, 177 and 178 are connected as a counter of 5, triggered by $\emptyset 1$ pulses. FF179 is reset by $I_1$ and hence resets the counter at the beginning of $I_1$. FF179 is set by the next $\emptyset 3$ to yield $\overline{I_1\emptyset 3}$. At each count of five $\emptyset 1$ pulses, the 1-output of FF178 goes high and remains high to the next $\emptyset 1$ pulse, as shown by G5 in FIG. 12. The 0-output is low in this interval and enables gates 181, 182. Gate 181 is pulsed by $\overline{\emptyset 2}$ to yield $G5\emptyset 2$ and, by inversion, $\overline{G5\emptyset 2}$. Gate 182 is similarly pulsed by $\emptyset 3$ to yield $G5\emptyset 3$ and $\overline{G5\emptyset 3}$. The unbarred pulses are shown in FIG. 12

Referring to FIG. 13, box 183 shows the read-write circuitry for track number 1 of a given zone, and box 184 indicates similar arrangements for tracks 2 through 12 of that zone. The entire arrangement is duplicated for each zone (FIG. 4). Read-write head 44 is shown with corresponding write and read amplifiers 185, 186. Input gate 187 is connected to one amplifier input, and its output inverted by 187' for the other input. When writing is to be done, $\overline{\text{WE-1}}$ will be low and $\overline{\text{WP}}$ will go low at each pulse WP of FIG. 12. If $\overline{\text{DNI-1}}$ from the shift register of FIG. 10 is also low, the output of 187 will be high and a 1-bit writen on the drum. If $\overline{\text{DNI-1}}$ is high, a 0-bit will be written. The inputs for tracks 2–12 will be the same, except that $\overline{\text{DNI-2}}$ through $\overline{\text{DNI-12}}$ will be applied.

The output of Read amplifier 186 is fed to a DC flip-flop 188, 188' which is reset by $\emptyset 3$ after each drum bit interval. If a 1-bit is on the drum, the flip-flop will be set and the output of 188 goes low. This is designated $\overline{\text{DN0-1-1}}$, and inverted to form DN0-1-1. Box 184 yields similar outputs for tracks 2–12.

As the bits on the drum are read out, the five bits in a cell of a track are checked for parity by FF189. This is a toggle FF reset before each drum cell by $G5\emptyset 3$, and triggered by each 1-bit from the drum. For correct parity there should be two 1-bits in each cell, and FF189 should be in its reset state at the end of the cell, giving a low PED-1-1. If parity is not correct, PED-1-1 will be high. Similar outputs are obtained from box 184 for the other tracks in the zone. Although bits are intended to be written on the drum during the WP intervals, there may be slight delays in practice. Terminating the read intervals by $\emptyset 3$ pulses to FF188, 188' allows read-out from the beginning of $\emptyset 1$ to the beginning of $\emptyset 3$, as shown at the bottom of FIG. 12.

Referring now to FIG. 14, the development of STROBE pulses is shown in box 54 at the bottom. $\overline{\text{ST}}$ is a negative pulse beginning at the middle of a D/U bit interval (FIG. 10). It is inverted and differentiated to yield a short negative pulse applied to gate 191. If the tape reader is off, TRON will be low and positive pulses will be applied to OR192.

Corresponding pulses are developed from the TR digit bits when the TR is on. The TR bits are supplied to OR193 and thence to gate 194. Gate 194 is inhibited by FF195, 195' except when the TR is actually transmitting a message. TR bit 6 indicates the start of an account number (FIG. 3), and is inverted to enable gate 196. If there are data bits for digit 1, gate 196 will set FF195 and its output will go low to enable gate 194. The FF is reset by RSD or SPC. $\overline{\text{STEP}}$ to gate 194 enables the gate prior to stepping the TR, and the gate is pulsed by $\overline{\text{G5}\emptyset\text{2}}$ to provide strobe pulses to OR192.

Figure 15:
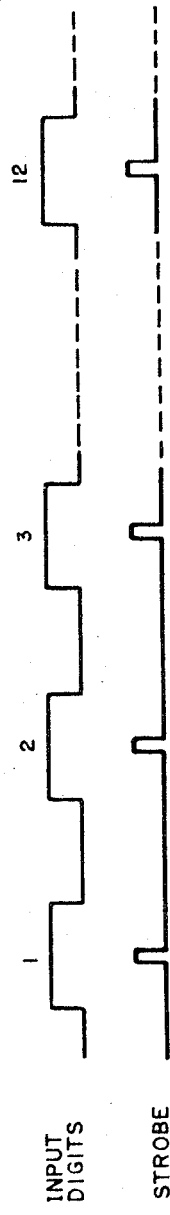

Accordingly, stroke pulses will be applied to gate 197 whenever a D/U or the TR is supplying an account number. ENABLE is high during the cycle mode of the Input Register (FIG. 10) to inhibit gate 197, but is low during the carry mode to supply the strobe pulses to line 198 and STROBE. The relationship of STROBE pulses to the input digits is shown in FIG. 15.

The Input Clock and Sync circuits are shown in box 56 and serve to correlate the processing of the input bits with the drum, since the digit rates are far different. A DC FF201, 201' is set by a STROBE pulse in line 198 and supplies a high steering input to $A_0$ of clock FF1. The next $I_1$ pulse to T will set FF1. The high 1-output is fed back to the $A_1$ input, and to 201' of the DC FF to reset it and cause $A_0$ to go low. The outputs of FF1 serve as steering inputs to FF2, and the latter steers FF3. The next $I_1$ pulse resets FF1 and sets FF2, the third pulse resets FF2 and sets FF3, and the fourth resets FF3.

Figure 16:
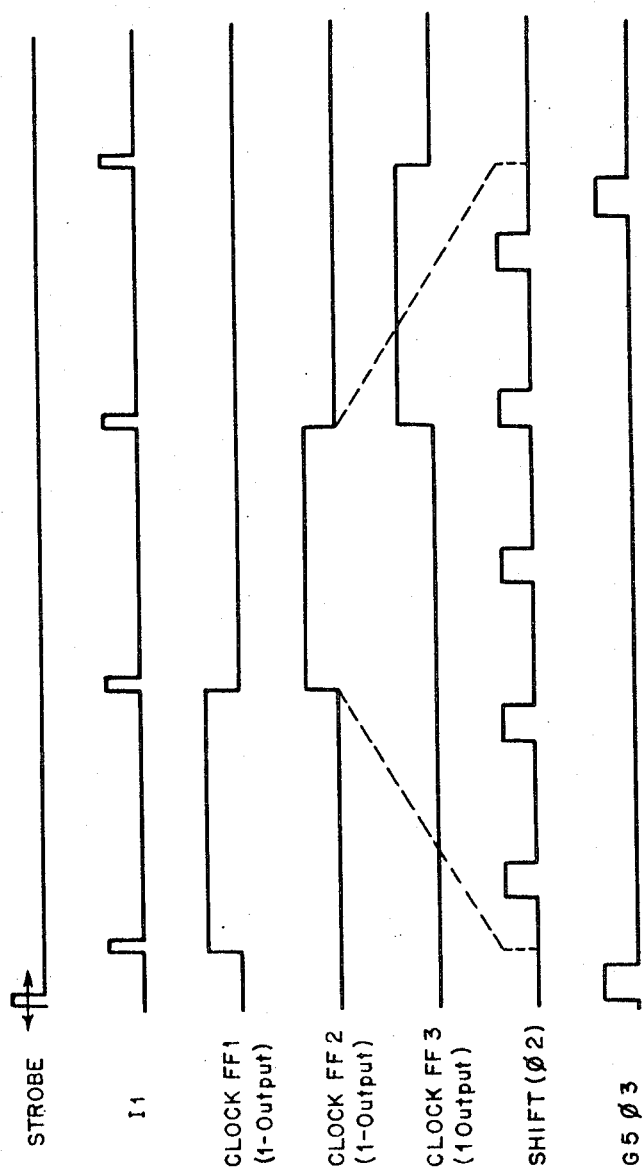

These relationships are shown in FIG. 16.

The 0-output of clock FF2 is the inverse of that shown in FIG. 16 and is denoted $\overline{\text{CLK2}}$. It is applied to gate 202 along with $\overline{\emptyset2}$ to produce $\emptyset_2 P$. Five $\emptyset 2$ pulses can pass through gate 202 while $\overline{\text{CLK2}}$ is low. They are applied in OR203 and inverted to product SHIFT pulses as illustrated in FIG. 16. This takes care of shifting during the Carry mode of operation.

The time occurrence of the STROBE pulse can vary with respect to $I_1$ as indicated in FIG. 16, since there is no synchronism therebetween. FF1 insures at least a $10\mu$ sec. delay (approximate interval between $I_1$ pulses) before FF2 is set, thus allowing the data bits to settle down in the Input Register before shifting occurs.

During the Cycle mode, $\overline{\text{ENABLE}}$ at gate 204 is low and allows $\emptyset 3$ pulses to pass to OR203, thus providing SHIFT pulses for that mode.

The Input Digit Counter in box 55 has four flip-flop stages arranged to count STROBE pulses in line 198, and hence count digits. All stages are reset by an RS signal developed by the previous answer (FIG. 9), ready for a new account number. The 0-outputs of the third and fourth stages open gate 205 at a count of 12, yielding a high output denoted TR HOLD. This is inverted and applied through line 206 to gate 207. Line 206 leads to output $\overline{\text{EAC}}$ which produces the End Around Carry in FIG. 10.

The Carry/Cycle Control in box 58 participates in controlling gate 207. FF208, 208' is reset by an RSD pulse after an answer, so that $\overline{\text{CYCLE}}$ is low and $\overline{\text{CARRY}}$ high. When a STROBE pulse appears in line 198 at the beginning of the next account number, FF208, 208' will be set, causing $\overline{\text{CARRY}}$ to go low and $\overline{\text{CYCLE}}$ high for the Carry mode of operation. FF209, 209' operates similarly. However, in addition to STROBE at the input of 209, HT is also applied and will set the FF. As will be explained, the circuit output is used to prevent stalling the system if a D/U is not operating properly. If a D/U establishes a hold signal, HT will set FF209 even though no digits are commutated to develop a STROBE. FF209 steers FF210, and the latter will be set by the next $\overline{\text{G5}\emptyset\text{2}}$ pulse to make DLY high and $\overline{\text{DLY}}$ low.

Upon a count of 12 in counter 55, the low potential in line 206 will enable gate 211. After completion of the shifting of the 12th digit, $\overline{\text{CLK3}}$ goes low and actuates gate 211 to deliver a high signal to 208' which resets the CARRY/CYCLE FF, thereby terminating the Carry cycle and causing $\overline{\text{CYCLE}}$ to go low. Also FF209, 209' is reset and the next $\overline{\text{G5}\emptyset\text{2}}$ resets FF210 to make DLY low. The low $\overline{\text{CYCLE}}$ actuates gate 207 to produce a high ENABLE signal, and by inversion a low $\overline{\text{ENABLE}}$.

When the tape reader is on, a count of 12 digits is used to check synchronization (FIG. 9). For this condition, gate 212 has a low $\overline{\text{TRON}}$, a low input from line 206, and a low ENABLE input during the Carry cycle. A $\overline{\text{G5}\emptyset\text{3}}$ pulse sets FF213 to make $\overline{\text{SPC}}$ low and SPC high. The next $I_1$ pulse resets the flip-flop and reverses the outputs.

FIG. 17 shows the Transmission Parity Check circuits at the central processor. Correct parity requires two bits per digit, and is checked as digits are shifted successively from Group 1 to Group 2 of the Input Register (FIG. 10). The end-around carry permits checking the 12th digit as it is transferred to Group 2. Steering gates 214, 214' to FF215 are enabled by $\overline{\text{CARRY}}$ during the Carry mode of operation. FF215 and FF216 are reset by an $I_1$ pulse preceding the shifting of the bits of a digit. The outputs of FF215 are cross-connected to the inputs of gates 214, 214' to form a toggle flip-flop which changes state upon occurrence of a $\emptyset 2P$ pulse when $\overline{\text{IBR-1}}$ is low (corresponding to a 1-bit). Two 1-bits will first set and then reset FF215, leaving its 1-output low. A reset of FF215 triggers FF216 to set it, yielding a low 0-output. Thus both inputs to gate 217 are low, giving a high output to inhibit gate 218.

With incorrect parity, the 1-output of FF215 will be high for one, three or five 1-bits. For four 1-bits, there will be two resets of FF215, thus first setting and then resetting FF216 to produce a high 0-output. In any of these cases one or the other input to gate 217 will be high, making its output low to enable gate 218. $\overline{\text{CLK2}}$ will be low, and upon occurrence of $\overline{\text{G5}\emptyset\text{3}}$ the output of gate 218 will yield a high PAR ER (parity error).

Upon occcasion a full 12-digit account number may not be sent to the central processor. This may be due to a failure to enter the full number at a D/U, faulty operation of the tape reader, transmission errors, etc. To avoid blocking the system if 12 digits are not supplied within a predetermined time, provision is made to send back an Error signal and release the processor for a new transmission.

When a D/U sends a Hold signal to the sequencer (FIG. 8), HT goes high. Similarly, when a tape reader is transmitting a high STROBE is developed. These signals are supplied to OR219. The consequent low output of 219 is inverted and triggers a one-shot MV220. It also develops $HT+STROBE$ for gate 209 (FIG. 14). When MV220 is set, the Reset line 221 goes low and, by inversion, ELAPSE TIME goes high. If left to itself, MV220 will reset after a predetermined time, causing ELAPSE TIME to go low. Gate 222 is supplied with $\overline{\text{CLK3}}$ which is normally high, but goes low after each shifting of a digit into the Input Register. During the Carry mode DLY is high, but upon receipt of 12 digits the Carry mode ends and DLY goes low. If this ocurs before MV220 resets itself, the output of gate 222 will reset MV220 and ELAPSE TIME will go low.

ELAPSE TIME is applied to gate 223. If 12 digits have been received in normal time, $\overline{\text{DLY}}$ will be high when ELAPSE TIME goes low, and gate 223 will be inhibited. However, if an excessive time has elapsed, $\overline{\text{DLY}}$ will be low (Carry mode) when ELAPSE TIME goes low due to MV220 resetting itself, and the next $\overline{\text{G5}\emptyset\text{3}}$ will produce a high ELA ER (elapse time error).

Gate 224 develops a TR out-of-sync signal, denoted TAP ER, like gate 144 in FIG. 9. Gates 225 and 226 produce high outputs when an insert or an erase has not been accomplished, respectively, and results in a high OP ER (operation error).

Each of the error signals sets a corresponding FF227 to light a respective lamp. When the cause of the error has been found and removed, switch 228 may be closed to reset all flip-flops.

Figure 23:
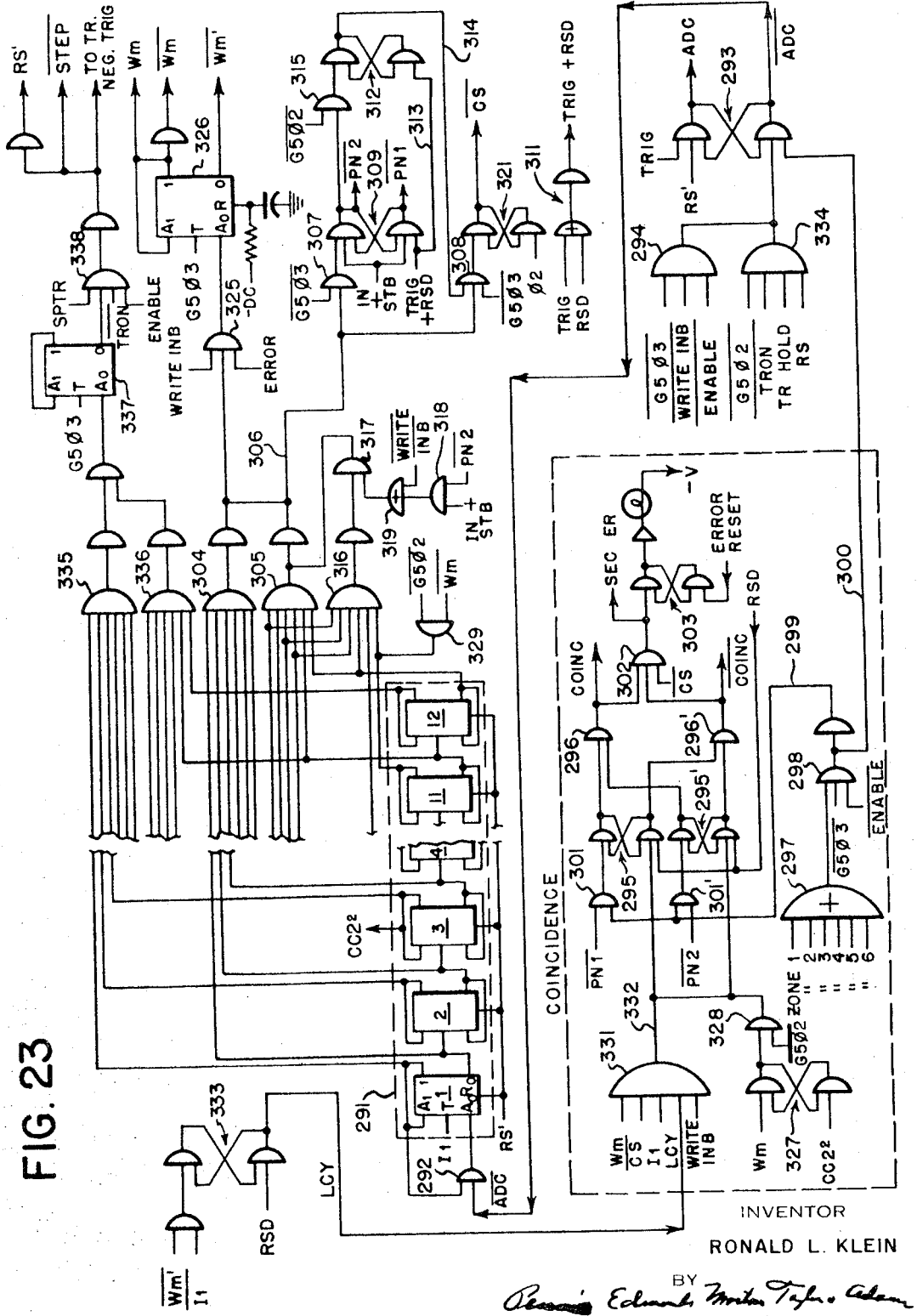

The four error signals described above are supplied to OR229 along with SEC ER (FIG. 23). Any of the signals will give a low output which is inverted and sets FF230 to make $\overline{\text{ERROR}}$ low and ERROR high. FF230 is reset by RSD after an answer back.

Figure 18:
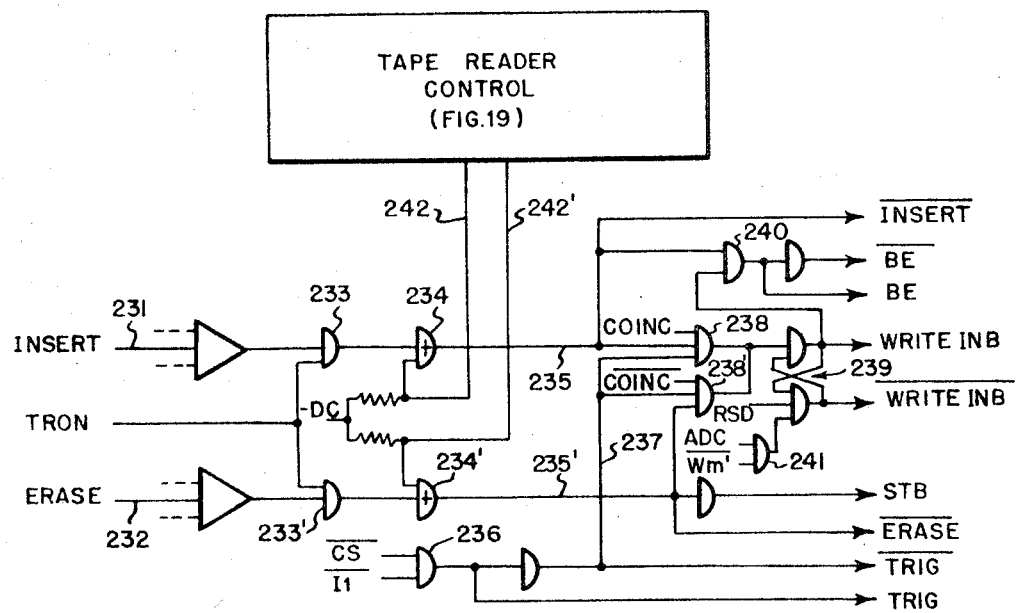
FIG. 18 shows the Insert/Erase control.

Referring now to FIG. 18, part of the Insert/Erase circuitry is shown. The INSERT and ERASE lines 231, 232 come from a D/U unit (FIG. 7). For an insert, line 231 will be high, amplified with inversion, and applied to gate 233. With $\overline{\text{TRON}}$ low, the output of gate 233 will be high and that of OR234 low at line 235. This gives $\overline{\text{INSERT}}$. For an erase, a similar operation will make line 235′ low, giving $\overline{\text{ERASE}}$. For either operation, the drum is first searched during one pass (supra), during which $\overline{\text{CS}}$ is high to inhibit gate 236. $\overline{\text{CS}}$ goes low at the end of pass, and an $\bar{I}_1$ pulse passes therethrough to yield a positive TRIG pulse. This is inverted to form $\overline{\text{TRIG}}$, and applied to line 237 to enable gates 238, 238′, which control Write Inhibit FF239, 239′. This FF is reset by RSD after a previous answer, yielding a low $\overline{\text{WRITE INB}}$ and high WRITE INB.

For an insertion, the account number should not be on the drum. If it is, COINC will be high at the end of the first pass, inhibiting gate 238 and leaving FF239 reset to inhibit writing. On the other hand, for erasing the number should be on the drum and, if not, $\overline{\text{COINC}}$ will be high to inhibit gate 238′ and likewise leave FF239 reset. If the opposite conditions occur, FF239 will be set to allow writing.

For writing during insert, blanks must be found on the drum. The setting of FF239 provides a low enabling input to gate 240 which, with low line 235, yields a high BE, and by inversion a low $\overline{\text{BE}}$. For writing blanks during erase, the low condition of line 235′ is inverted to form a high STB.

Writing or erasing occurs at the end of the second pass on the drum, and should not occur during the third pass. To prevent this, gate 241 receives low $\overline{W_m'}$ and ADC signals at the beginning of the third pass to produce a high output which resets FF239.

Figure 19:
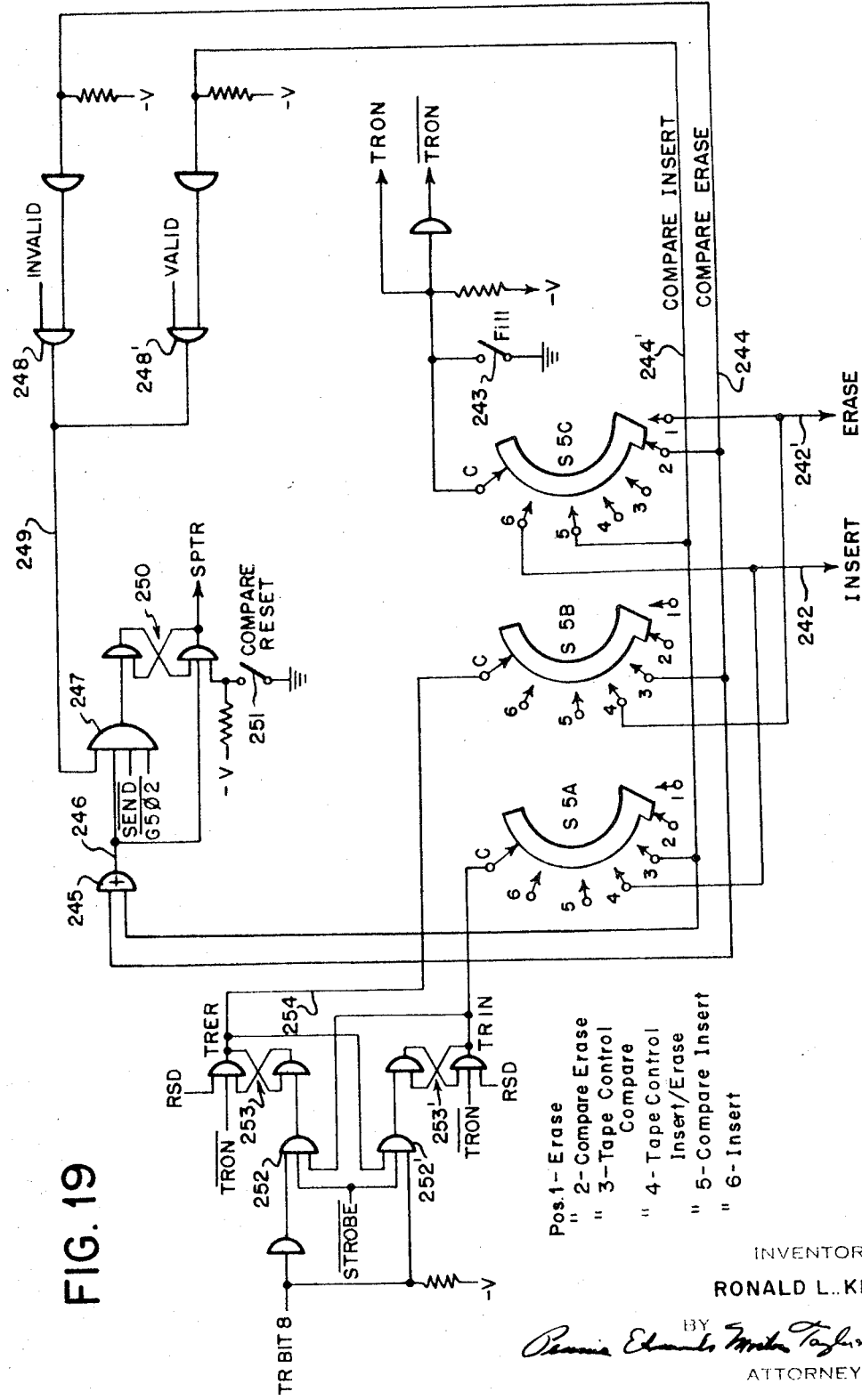
FIG. 19 shows tape reader control circuits.

FIG. 19 shows the TR control circuits. A six-position three-gang switch S5A–S5C allows selection of the operations listed. When using the TR, Fill switch 243 is closed to produce a high TRON and, by inversion, a low $\overline{\text{TRON}}$, and makes the blade S5C high. In position 1, Erase line 242′ is high, and in position 6, Insert line 242 is high. These lead to FIG. 18, and operation proceeds as described therein. For either operation, all account numbers on the tape are erased from the drum or inserted thereon, as the case may be.

At any time a group of account numbers on a tape may be compared with those on the drum to make sure they are there (Compare Insert) or that they are not there (Compare Erase).

For Compare Erase, Position 2 is employed. Line 244 is high to OR245, making the output line 246 to gate 247 low. The high line 244 is inverted and applied to gate 248 along with INVALID. If the number is not on the drum, INVALID will be low and line 249 high to inhibit gate 247. If the number is on the drum, INVALID will be high and line 249 will go low to enable gate 247. At answer back, $\overline{\text{SEND}}$ will go low and $\overline{G5\emptyset 2}$ will make the gate output high to set FF250. Accordingly SPTR will go high to stop the tape reader. When the discrepancy has been noted, reset switch 251 may be closed to reset FF250 and allow operation to continue.

For Compare Insert, Position 5 is used, grounding line 244′. A similar operation takes place, except that gate 248′ is now effective. If the number is on the drum, VALID will be low and line 249 high to inhibit gate 247. If not on the drum, VALID will be high and line 249 low to set FF250 and develop a high SPTR.

Provision is also made for tape controlled insert and erase via TR Bit 8 (FIG. 3). If a 1-bit is present, Erase is indicated. This is inverted to enable gate 252, and applied directly to gate 252′ to inhibit it. FF253 and 253′ are reset by RSD after an answer back. With $\overline{\text{TRON}}$ low, the high output of gate 252 at $\overline{\text{STROBE}}$ time sets FF253 to develop a high TRER (tape reader erase). This is supplied to gate 252′ to inhibit it, and along through line 254 to the blade of S5B to make it high. Similarly, if the TR Bit 8 is low (no hole in the tape), gate 252′ will be enabled to set FF253′ and develop a high TRIN (tape reader insert) which makes the blade of S5A high. Accordingly, in switch Position 4, the Insert and Erase lines 242, 242′ will be high or low depending on the absence or presence of TR Bit 8, and produce insert or erase as described for FIG. 18.

Position 3 allows a group of account numbers on a tape to be compared for insertions and erasures using the absence or presence of TR Bit 8. One or the other of lines 244, 244′ will be high to OR245 and enable gate 247. Gates 248, 248′ will function alternatively depending on which of lines 244, 244′ is high, and a high SPTR will be developed for incorrect insertion or erasure as described above.

Figure 20:
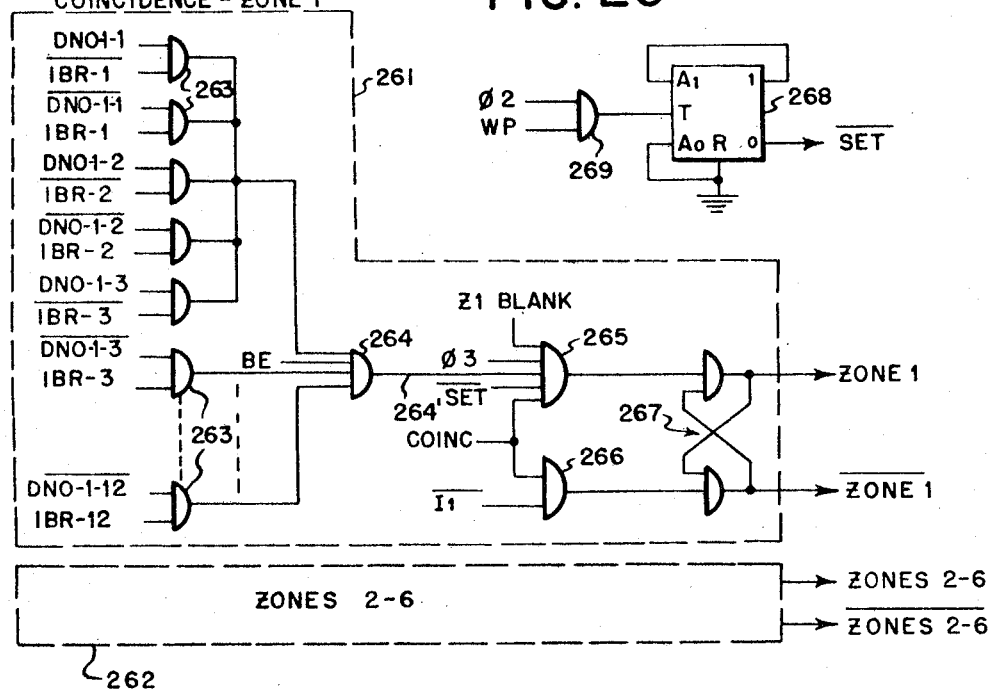
FIG. 20 shows circuits for determining coincidence between requested and stored account numbers.

Referring to FIG. 20, coincidence circuits for zone 1 on the drum are shown in box 261. Similar circuits are provided for zones 2–6 as indicated by box 262. As shown in FIG. 4, the digits in each track of each zone are coded as five sequential bits. As shown in FIG. 13, in zone 1 the digit bits on the drum for the twelve tracks of zone 1 are DNO–1–1 through DNO–1–12, with corresponding barred signals. From FIG. 10, the corresponding digit bits of the account number in the input register are BR1–1 through IBR–12 with corresponding barred signals, the bits of each digit occurring sequentially in the cycle mode. These signals are applied in pairs to gates 263 of FIG. 20 as shown, two gates being used for each digit. If coincidence exists, one or the other of the two inputs to each gate will be high. Hence the outputs of all gates 263 will be low and the corresponding inputs to gate 264 will be low. BE will be low except during the second pass of insert or erase, and accordingly the output of gate 264 will be high. For no coincidence, the output of gate 264 will be low.

Gates 265 and 266 control FF267. In the absence of coincidence, COINC will be low and FF267 reset by $\bar{I}_1$, yielding a high ZONE 1 output and low $\overline{\text{ZONE 1}}$. When coincidence occurs, the high line 264′ will cause the output of gate 265 to be low throughout a cell interval, thus leaving FF267 reset. Accordingly, upon coincidence ZONE 1 will be high and $\overline{\text{ZONE 1}}$ low. COINC will thereupon go high (FIG. 23) to inhibit gates 265, 266 and prevent change in FF267 until COINC goes low as described later.

If there is lack of coincidence, line 264′ will be low. Z1 BLANK will be low except upon finding blanks during a second pass of insert. During read intervals (FIG. 12), $\emptyset 3$ will be low. The $\overline{\text{SET}}$ input is developed by FF268 having a trigger input from gate 269. FF268 is normally reset, giving a high $\overline{\text{SET}}$ which inhibits gate 265. WP will be high from $\emptyset 1$ to $\emptyset 2$ (FIG. 12) and thereafter $\emptyset 2$ will be high. At the end of $\emptyset 2$, the output of gate 269 will go high to trigger FF268 and produce a low $\overline{\text{SET}}$. This causes the output of gate 265 to go high and set FF267. Thus ZONE 1 will go low and $\overline{\text{ZONE 1}}$ high if no coincidence is found. Gate 265 will be inhibited when $\emptyset 3$ occurs, and FF268 will reset itself.

Figure 21:
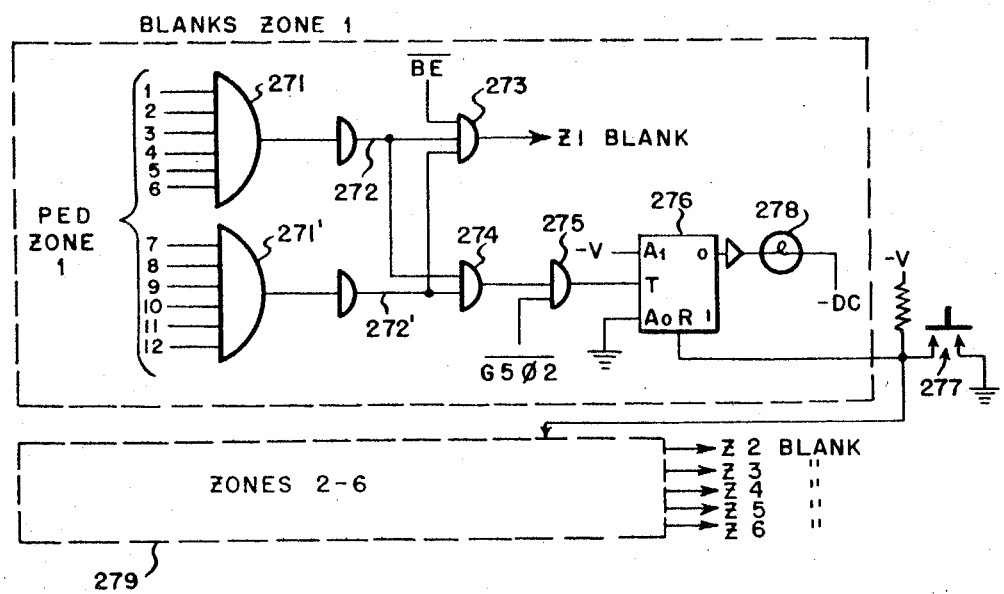
FIG. 21 shows a drum blank detector.

FIG. 21 shows the way blanks are found on the drum for inserting new account numbers. FIG. 13 shows the development of PED–1 through 12 for zone 1. These signals are low for 0-bits and high for 1-bits. They are applied to gates 271, 271′ in FIG. 21. If all 0- bits are found in a row of zone 1 (FIG. 4), the gate outputs will be high and, upon inversion, lines 272, 272′ will be low. BE will be low when searching for blanks, and therefore the output of gate 273 will be a high Z1 BLANK. If any 1-bit occurs, one or another input to gates 271, 271′ will go high, giving a low output and a low Z1 BLANK.

Z1 BLANK is applied to gate 265 of FIG. 20 and will inhibit the gate for a blank but enable it for no blank. At this time BE will be high, inhibiting gate 264 and making line 264' low. The other inputs to gate 265 will be as described above. Consequently FF267 will be left reset for a blank, giving a low $\overline{\text{ZONE 1}}$, and set for no blank, giving a high $\overline{\text{ZONE 1}}$.

Returning to FIG. 21, lines 272, 272' are also connected to gate 274. The output of 274 is supplied to gate 275 along with $\overline{\text{G5}\emptyset\text{2}}$. Gate 275 provides a trigger input to FF276 which continuously checks the drum for parity error, thereby guarding against accidental errors in the account numbers thereon. FF276 is reset by switch 277. $\overline{\text{G5}\emptyset\text{2}}$ occurs at the end of a drum cell, and at this time all PED signals for zone 1 should be low if parity is correct in each digit track. Thus FF276 is left reset. If there is a drum parity error, one of the PED inputs will be high at time $\overline{\text{G5}\emptyset\text{2}}$, triggering FF276 and lighting lamp 278. When the error has been found and corrected, switch 277 may be closed to reset FF276, and lamp 278 will go out until another drum parity error occurs.

Similar circuits are provided for zones 2–6 as indicated by box 279.

Figure 22:
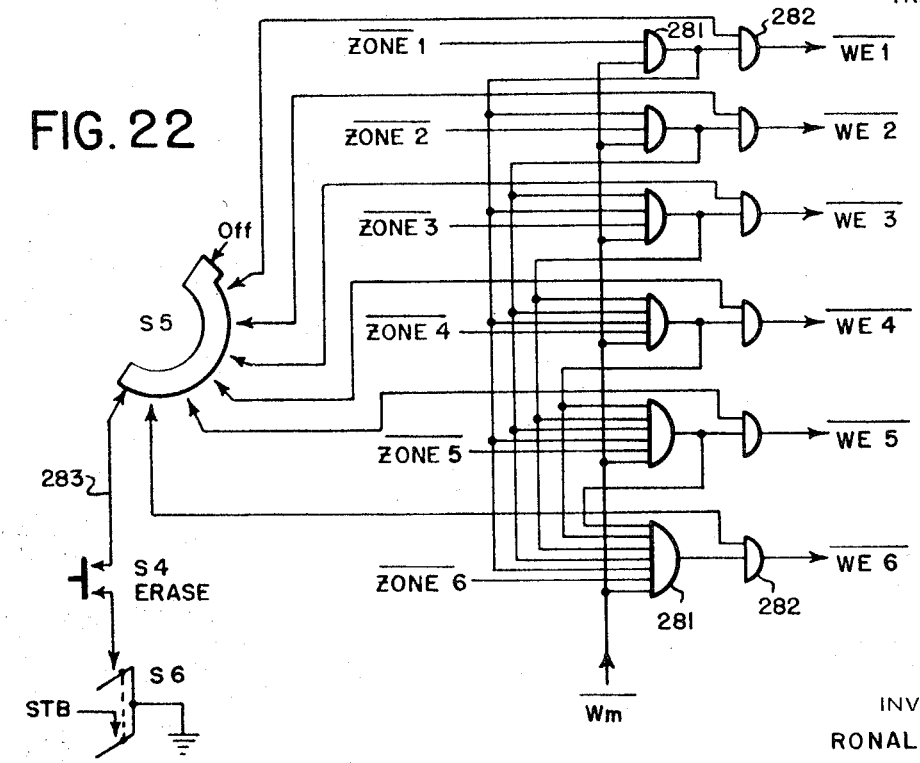
FIG. 22 shows the zone priority control circuits.

FIG. 22 shows the zone priority control of block 71 in FIG. 5. During the Insert mode, if blanks occur simultaneously in several zones, the first zone having a blank is selected for writing an account number on the drum. During the Erase mode, the circuit selects the proper zone in which an account number is to be erased.

Considering first an Insert mode, $\overline{\text{ZONE 1}}$–$\overline{\text{ZONE 6}}$ from FIG. 20 are applied to respective gates 281 in FIG. 20. The gate outputs are supplied to respective gates 282 to yield $\overline{\text{WE1}}$–$\overline{\text{WE6}}$. Gates 281 are supplied with $\overline{\text{W}m}$ which goes low at the time writing is to occur. The output of each gate 281 is connected to the inputs of all succeeding gates. Consequently, if any of $\overline{\text{ZONE 1}}$–$\overline{\text{ZONE 6}}$ goes low for a blank, the output of the corresponding gate 281 will go high to inhibit all succeeding gates. At the same time the output of the corresponding gate 282 will go low to produce a low $\overline{\text{WE}}$. For example, if blanks simultaneously occur in zone 1 and in one or more of zones 2–6, a low $\overline{\text{WE1}}$ will be produced but $\overline{\text{WE2}}$–$\overline{\text{WE6}}$ will be high.

For the Erase mode, one of signals $\overline{\text{ZONE 1}}$–$\overline{\text{ZONE 6}}$ will go low upon coincidence being found in the respective zone. The corresponding $\overline{\text{WE}}$ output will go low, thus identifying the zone of the account number to be erased.

Switches S4–S6 are provided for manual erasing zone by one. With S6 (key-operated) closed, STB goes high, and closing S4 makes line 283 high. S5 may be rotated clockwise to connect line 283 to gates 282 in turn, thereby causing the respective $\overline{\text{WE}}$ output to go low. From FIG. 10, a high STB gives a high $\overline{\text{DNI}}$ for all 12 digits. In FIG. 13, a high $\overline{\text{DNI}}$ together with a low $\overline{\text{WE1}}$ writes 0-bits in zone 1, hence erasing. As S5 is turned to succeeding zone positions, erasing is produced therein.

Referring to FIG. 23, a counter and associated circuits are shown which participate in properly controlling the various operations. Overall, in a normal interrogation mode the counter is controlled to produce two passes on the drum for developing an answer, in an Insert or Erase mode the counter is controlled to produce three passes, and when the TR is on, it produces stepping of the TR.

A 12-stage counter 291 is shown, intermediate stages being omitted for simplicity of illustration. The first stage is supplied with $I_1$ trigger pulses. Hence the counter can count up to 4096 at the drum cell rate. The counter is reset by RS', which can be developed in either of two ways. One is by an answer back (FIG. 9) and the other when stepping the tape reader (upper right of FIG. 23).

Gate 292 allows counting to proceed when $\overline{\text{ADC}}$ is low, and stops counting when $\overline{\text{ADC}}$ is high. This signal is developed by the ADC FF293.

Considering first a normal interrogation by a D/U, RS' will have gone high upon a previous answer back to reset counter 291 and FF293, the later producing a high $\overline{\text{ADC}}$ which prevents counting. The $\overline{\text{ENABLE}}$ input to gate 294 will be low if an account number is in the Input Register of FIG. 10 and the Cycle mode is established, the $\overline{\text{WRITE}}$ INB will be low, and a $\overline{\text{G5}\emptyset\text{3}}$ pulse will produce a high gate output to set FF293. $\overline{\text{ADC}}$ will go low and counting will start.

A pair of coincidence flip-flops FF295, 295' are reset by RSD after a previous answer back, and the resultant high outputs to gate 296 and low outputs to 296' will make COINC low and $\overline{\text{COINC}}$ high. If coincidence is found in the first pass, one or another of inputs ZONE 1–ZONE 6 to OR 297 will go high, enabling gate 298. $\overline{\text{G5}\emptyset\text{3}}$ to gate 298 will, by inversion, make line 299 low and enable gates 301, 301'. $\overline{\text{PN1}}$ (Pass Number 1) will be low during the first drum pass and gate 301 will set FF295. If coincidence is again found in the second pass, line 299 will again go low, and this time $\overline{\text{PN2}}$ (Pass Number 2) will be low. Thus gate 301' will set FF295'.

With coincidence on both passes, both inputs to gate 296 will be low, making COINC high. Both inputs to gate 296' will be high, making $\overline{\text{COINC}}$ low. If there is coincidence on one pass but not the other, one or the other inputs to 296 and 296' will be high, making both COINC and $\overline{\text{COINC}}$ low. This is an error condition. Gate 302 will be enabled, and upon occurrence of a low $\overline{\text{CS}}$ at the end of the second pass, a high SEC ER (second pass error) will be developed. This sets FF303 to light a lamp. An Error reset signal will reset FF303. If no coincidence is found on both passes, line 299 will not go low, FF295 and FF295' will remain reset, COINC will remain low and $\overline{\text{COINC}}$ high. After the two passes, the proper answer back will be produced (FIG. 9) and RSD developed to reset FF295 and FF295', ready for a new interrogation.

$\overline{\text{PN1}}$ and $\overline{\text{PN2}}$ are developed with the aid of counter 291. Gates 304 and 305 are connected to the stages of counter 291 to recognize a count of 3199, and when this is reached their outputs go high and, by inversion, make line 306 low. Line 306 enables gates 307, 308. A $\overline{\text{G5}\emptyset\text{3}}$ to gate 307 at the end of the cell where 3199 occurs will set FF309. FF309 has been reset by the RSD of the $RSD + TRIG$ input (developed as shown at 311), making $\overline{\text{PN1}}$ low and $\overline{\text{PN2}}$ high. FF312 is also reset through line 313, making line 314 high to inhibit gate 308 during the first pass. Input $IN + STB$ to FF309 will be low for normal interrogation and will not inhibit the FF.

The low $\overline{\text{PN1}}$ during the first pass enables gate 301 in the coincidence circuit as already described. When FF309 is set at the end of the count of 3199, $\overline{\text{PN2}}$ will go low and enable gate 315. It also enables gate 301'. $\overline{\text{G5}\emptyset\text{2}}$ to gate 315 goes low at the end of the next cell on the drum (count of 3200), setting FF312 and removing the inhibition of line 314 on gate 308.

Counter 291 will continue counting to 4096 and start over. When it reaches a count of 2303, it will have counted 3199 from its previous count of 3200. The count of 2303 is recognized by gates 304 and 316. The high output of 316 is inverted and applied to gate 317. A low $\overline{\text{PN2}}$ at gate 318 will give a high output to OR319, making its output low to gate 317. Accordingly, at a count of 2303, the high output of 317, upon inversion, will (with the inverted output of gate 304) make line 306 low. Gate 308 will now operate at $\overline{\text{G5}\emptyset\text{3}}$ to set FF321, thereby making $\overline{\text{CS}}$ low. This will develop $\overline{\text{TRIG}}$ at $I_1$ time (FIG. 18) and produce an answer back (FIG. 9). FF321 is reset by the next $\emptyset_2$. TRIG will promptly reset FF309 and FF312, ready for a new interrogation.

Considering now the insertion of an account number on the drum, during this operation IN to FF309 will be high (FIG. 9), thus making both $\overline{PN1}$ and $\overline{PN2}$ low.

FF312 will be reset by RSD and promptly set by $\overline{G5\emptyset2}$ at gate 315, making line 314 to gate 308 low. Counter 291 and ADC FF293 will be reset by RS'. Gate 294 will set FF293 as in normal interrogation, and the counting started. At 3199 line 306 will go low, setting FF321 and making $\overline{CS}$ low. If the number is already on the drum, gate 297 will operate as before to make line 299 low, both FF295 and FF295' will be set, and a high COINC developed to return an Invalid answer back and the insertion mode terminated (FIG. 9). If the number is not on the drum, there will be no answer back, and a second pass will begin.

FIG. 24A illustrates the timing of this portion of the operation. The Counter line shows when the outputs of gates 304, 305 go high at a count of 3199. At the time of the next G5$\emptyset$3 pulse the CS FF321 is set, and TRIG is developed at the time of the next $I_1$ pulse. TRIG resets the ADC FF293 causing ADC to go low, and $\overline{ADC}$ high to stop counter 291. However, the $I_1$ pulse will have flipped the counter to 3200 before the inhibition becomes effective. If coincidence has not been found, COINC will be low, and $\overline{TRIG}$ will make WRITE INB low and BE high (FIG. 18), as illustrated.

Counter 291 will remain at 3200, and the search for blanks on the drum will begin. When a blank is found, one or the other of the inputs to gate 297 will go high, and line 299 low to make COINC high. The high output of gate 298 in line 300 will also set FF293, making $\overline{ADC}$ low and allowing counter 291 to proceed. FIG. 24A shows at 322 the last possible coincidence during the first pass on the drum, and at 323 the first possible blank detection in the second pass. If the blank is detected at 323, ADC will immediately go high as shown at 324, and consequently $\overline{ADC}$ will go low.

Counter 291 proceeds to its maximum count of 4096 and starts over. When it reaches a count of 2303, it will have counted 3199 cells from the point where the blank space was found. The count of 2303 will set CS FF321 as described for the second pass of normal interrogation and as illustrated in FIG. 24B. For this operation $\overline{WRITE INB}$ will be high to OR319 and will enable gate 317. $\overline{CS}$ will go low. This will produce TRIG at the next $I_1$ time, resetting ADC FF293 and causing $\overline{ADC}$ to go high to stop counter 291 at 2304.

When line 306 goes low at 2303, gate 325 is opened since WRITE INB is low, and ERROR is low if there is no error. Acordingly W$m$ FF326 will be set by the next G5$\emptyset$3 pulse, giving a high W$m$ as shown in FIG. 24B. This allows writing the account number stored in the input register (FIG. 10) on the drum. The proper zone for writing has previously been selected (FIG. 22), and the low $\overline{Wm}$ allows the proper $\overline{WE}$ to go low for the selected zone. The account number is written as described for FIG. 13.

ADC goes low upon stopping the counter at 2304 and, with W$m$ low, the Write Inhibit FF241 (FIG. 18) will be reset to cause WRITE INB to go high and BE to go low, as shown in FIG. 24B. The high WRITE INB at gate 325 will steer FF326 toward reset, and the next G5$\emptyset$3 will reset it to make W$m$ low. This terminates the writing at the end of the proper cell. The biasing circuit for R of FF326 insures that it will be reset when power goes on, before the capacitor has had time to charge negatively.

The coincidence flip-flops are then reset by FF327, and repeatedly reset for a short time to allow the writing heads to settle down before the coincidence circuits can function again. When W$m$ goes high it sets FF327 and enables gate 328. The $\overline{G5\emptyset2}$ pulse at the end of writing, and subsequent pulses, repeatedly supply resetting signals to FF295 and 295', thereby making COINC low. When CC2$^2$ from counter 291 next goes high, FF327 is reset to inhibit gate 328 and prevent further resetting by $\overline{G5\emptyset2}$.

A third pass around the drum now takes place to make sure the account number has been inserted. With the count starting at 2304, counting to 4096 and then to 1408 would suffice. However, this would require additional recognition circuits. To avoid this, the counter is advanced to 3328 by forcing the 11th stage to its set condition by gate 329. With $\overline{Wm}$ low during writing in a cell, a $\overline{G5\emptyset2}$ pulse occurring near its end gives a high gate output to advance the counter as illustrated in FIG. $\overline{24B}$. $\overline{WRITE INB}$ is now low at gate 294, and the next $\overline{G5\emptyset3}$ sets FF293 to make $\overline{ADC}$ low.

The counter then resumes counting. Both inputs to OR319 will be low so that gate 317 will be inhibited and not recognize a count of 2303. Upon reaching 3199, line 306 again goes low to give a low $\overline{CS}$ at a count of 3200. If in the meantime coincidence has been found, $\overline{COINC}$ will go low, and upon occurrence of $\overline{TRIG}$ an Invalid answer back is produced (FIG. 9). If no coincidence is found, a Valid answer back will result.

Considering now an Erase operation, during the first pass the drum will be searched for the account number to be erased, as in the case of Insert. If not found, a Valid answer back will be developed and the cycle terminated. If found, the second pass will begin. In this case it is important to reset the coincidence flip-flops promptly, since the account number may occur at the beginning of the pass. Gate 331 provides for this. Inputs W$m$, $\overline{CS}$, LCY and WRITE INB will be low at count 3200, and a high pulse will be produced in line 332 beginning at the trailing edge of $I_1$ and ending at the leading edge of the first $\emptyset$2 in the next cell when $\overline{CS}$ goes high. This is shown by COINC RESET in FIG. 24A, and resets FF295 and 295'.

When the account number is again found in the second pass, one of the inputs to gate 297 will go high. FF295 and 295' will be set to produce a high COINC and FF293 set to allow counting to resume. At a count of 2304, W$m$ will be high to permit writing for one cell interval. In this case 0–bits will be written to erase the previous number. The zone in which the number is to be erased has been determined (FIG. 22) and the proper $\overline{WE}$ in FIG. 13 will go low. The $\overline{DNI}$ inputs will be 0–bits since STB will be high to force them from the input register outputs (FIG. 10).

The third drum pass will then ensue as in the Insert mode, and a Valid or Invalid answer back produced depending on whether the erasure has been successful or not. During the third pass, gate 331 is inhibited from resetting coincidence FF295 and 295' by LCY developed by FF333, which is set at the end of the second pass by $\overline{Wm}$ and $\overline{I_1}$. After the answer back, RSD will reset FF333, FF295 and 295'.

For insertion and erasure by the tape reader, operation is as given above. However, the counter 291 is additionally used to step the tape reader. FIG. 25 shows pertinent waveforms. The ADC FF293 is repeatedly set by gate 334 during the stepping and alternately reset by RS'. $\overline{TRON}$ will be low when using the TR, TR Hold will be low until 12 digits have been inserted in the Input Register, RS will go low after a previous answer back, and the next $\overline{G5\emptyset2}$ will pass through gate 334 to set FF293 and allow counter 291 to operate. A count of 1600 is recognized by gates 335, 336, the outputs combined to steer FF337, and the FF set by the next $\overline{G5\emptyset3}$. Gate 338 has inputs SPTR, $\overline{TRON}$ and ENABLE which are all low as the TR starts stepping. The high output of 338 is inverted to provide a negative triger to the tape reader which actuates conventional mechanism therein to step one sprocket hole. It also provides a low $\overline{STEP}$, and is inverted to provide a high RS'. The latter resets counter 291 and ADC $\overline{FF293}$. The next G5∅2 again sets FF293 and the cycle repeats. This continues at a rate of approximately 60 c.p.s. corresponding to the conventional TR stepping rate until the 12 digit message is in the Input Register. Then TR HOLD goes high to inhibit gate 334. The Cycle mode of the Input Register begins at the next CLK 3 time, and ENABLE goes high to inhibit gate 338 and prevent further stepping of the TR. When ENABLE goes high, the next $\overline{G5∅3}$ pulse through gate 294 makes $\overline{ADC}$ low and allows counter 291 to start counting from its reset condition.

Insertion or erasure now proceeds as above described for a D/U. Upon each answer back an RS' is produced which starts stepping the TR to the next account number, and the operation repeats.

In the TR Compare modes, the counter will step the TR as above described. Neither the Insert or Erase lines 242, 242' (FIGS. 19, 18) will be energized, and operation will proceed as described above for normal D/U interrogation. If there is an error, SPTR will go high to inhibit gate 338 until the reset switch 251 is closed.

FIG. 25 illustrates certain waveforms applicable to TR stepping. Only a few need be mentioned. The output of gate 338 is shown at 341. The next strobe 342 is assumed to be that supplying the 12th digit to the Input Register, making its output high at 343 and developing SPC pulses as shown at 344. The first pulse is effective to reset FF195, 195' (FIG. 14) and stop the development of strobe pulses, so the others are shown dotted. The clock outputs are shown, and when CCK FF3 is set, ENABLE goes high as shown so that the desired operations can be performed using the TR account number then stored in the Input Register.

The preceding embodiment has been explained in connection with a tape reader for rapid insertion, erasing and checking account numbers in the processor. Other forms of rapid readers may also be used, such as magnetic tape, card readers, etc.

Figure 26:
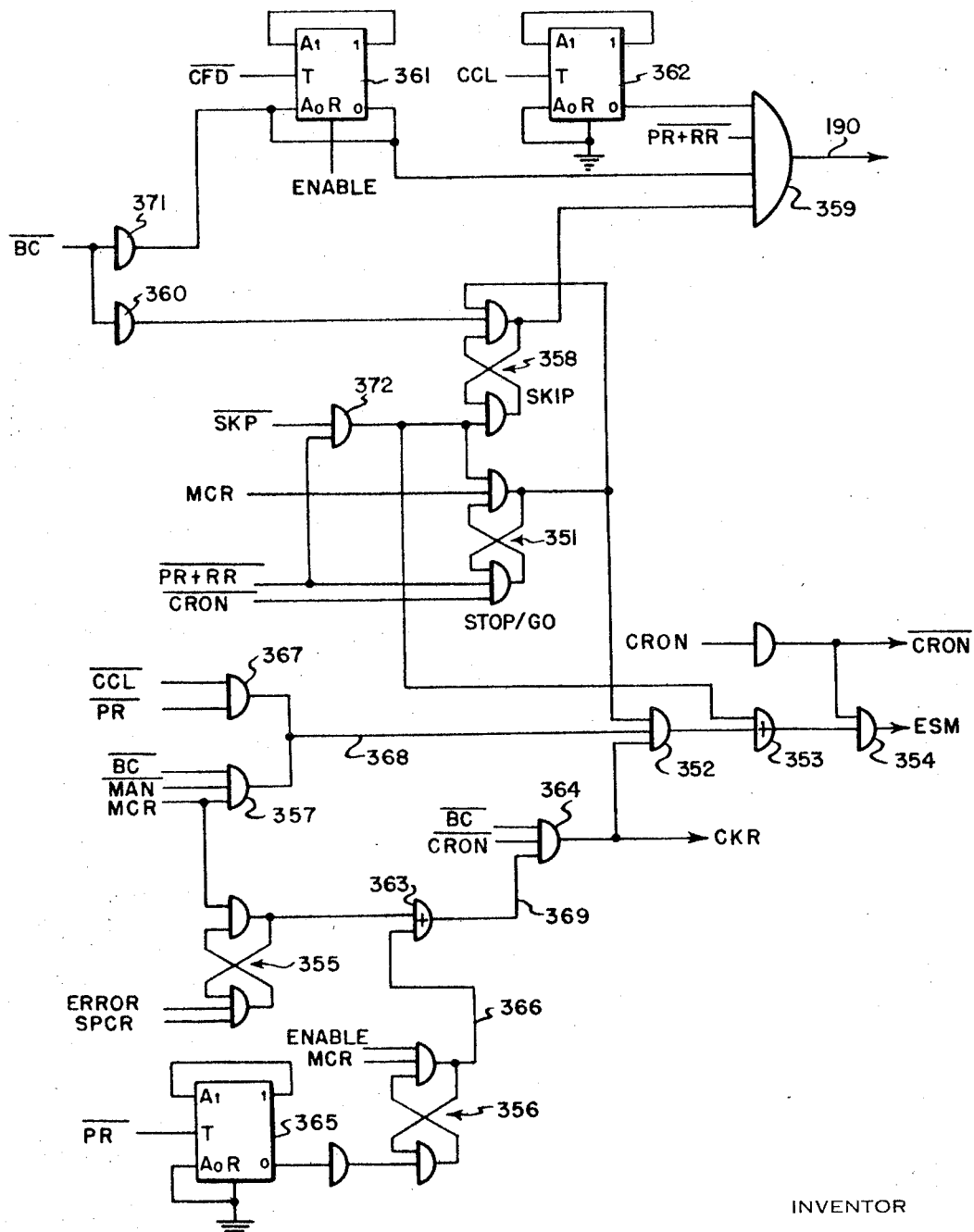
FIG. 26 shows control circuits for a card reader.

FIG. 26 shows a control circuit for use with a card reader. A number of specific card readers are known. For any particular reader the control circuits may be adapted to use the signals provided by the reader, and to provide suitable signals to the reader for control. In the card reader for which the circuit of FIG. 26 was designed, Hollerith cards were used in which the digits occurred in a field of twelve columns selected from columns 1 to 80, each column containing 12 bits. Seven more columns, 81–87, were available for control. The cards were read column by column and the digits converted to a 2-out-of-5 code by a matrix. Cards could be fed automatically in sequence for reading, or read one at a time under manual control.

The system described above using the tape reader can be modified for the card reader by omitting circuits applicable only to the TR and adapting others for the CR. Certain changes may be mentioned, and others will be obvious to those skilled in the art. TR and TRON will be replaced throughout by CR and CRON. In FIG. 9, gate 144 and signal TRCK may be omitted. In FIG. 10, CR bits will replace TR bits. In FIG. 14, the portions of Strobe box 54 from the TR will be replaced by CR, as described below. TR HOLD gate 212 and FF213 may be omitted. In FIG. 19 the 8th bit for Erase may be replaced by a corresponding bit from the CR. Instead of using the absence of the 8th bit for Insert, a separate bit from the CR may be employed. In FIG. 23 gate 334 and the circuits for stepping the TR may be omitted.

Referring now to FIG. 26, the following control signals available from the card reader are used:

BC—Between Cards, from col. 80.5 to 82.5
CCL—Clock Column, for each data column and 84.5–86.5
CFD—Clock Field, at beginning of a data field
CRON—Card Reader On, from the CR ON/OFF switch
MAN—Manual, from the CR Manual/Auto switch
MCR—Manual Card Register switch, to start reading
PR—Pressure Roller, up between 81 and 85.5
RR—Reader Ready, card at ready station
SKP—Skip, from a skip switch.

These signals are inverted as required to yield the corresponding barred signals, in FIG. 26. The central processor supplies to the card reader:

CKR—To light a lamp indicating an error
ESM—Escape Magnet, to control card movement.

To use the card reader, CRON is developed and MCR is applied to STOP/GO FF351 to set it to the GO state. This enables gate 352, OR353 and gate 354 to produce a high ESM which moves the card through the reader. MCR also resets error FF355 and FF356, and inhibits gate 357. $\overline{BC}$ will be low at this time, thus resetting Skip FF358 through inverter 360 and removing its inhibition of gate 359. As the field of columns containing digits is reached, Field FF361 will be set by the trailing edge of $\overline{CFD}$, removing its inhibition of gate 359. The combined PR & RR to gate 359 will be low at this time, and CCL will trigger Clock FF362 at each card column to produce positive pulses in line 190'. FF362 promptly resets after each setting, due to the grounded R.

Pulses in line 190' are used in the strobe circuit of FIG. 14 in place of the tape reader pulses in line 190, so that strobe pulses are developed for each digit. After the proper number of strobes have been counted, ENABLE goes high to hold FF361 reset and inhibit gate 359 until the operation on the account number just strobed is complete.

After the card reader has read the digits in the appropriate columns 1–80, BC will go high and $\overline{BC}$ low. If an error has appeared, causing either ERROR or SPCR (Like SPTR IN FIG. 19) to go high, FF355 will be set. The resulting high output to OR363 will actuate gate 364 to give a high CKR. This will light an error lamp at the card reader. Also, a high CKR will inhibit gate 352 and yield a low ESM which will stop the card reader. The ERROR or SPCR may be removed by reset, as in the tape reader, and the MCR switch actuated to reset FF355 and allow operation to continue.

To insure that each card is acted upon, $\overline{PR}$ triggers FF365 at its trailing edge, thus setting FF356 at the end of each card (and when initially starting up) and making line 366 high. Accordingly, line 369 will go low, but gate 364 is inhibited by a high $\overline{BC}$ at this time. After reading the next card, $\overline{BC}$ will go low to produce a high CKR which stops the card reader (by making ESM low), unless ENABLE has been developed in the meantime to reset FF356.

In continuing the operation, provision is made to stop momentarily at column 86 of the card, so as to allow the next card to be registered. This is accomplished by gate 367. $\overline{PR}$ is low from column 81–85.5 and $\overline{CCL}$ low from 84.5–86.5. During the overlap, 84.5–85.5, line 368 will go high to give a low ESM. Momentum of the reader mechanism will carry the card to column 86, so that line 368 will go low. The time constant of re-energizing the escape magnet introduces the desired pause.

For manual operation, a low $\overline{MAN}$ will enable gate 357, and upon occurrence of $\overline{BC}$, line 368 will go high to inhibit gate 352 and give a low ESM to stop the card reader after each card has been read. MCR can then be applied to read the next card.

To skip a card, $\overline{SKP}$ at gate 372 is made low. When $\overline{PR+RR}$ goes low at the end of reading a card, Skip FF358 is set and inhibits gate 359 to prevent developing strobe pulses for the next card. When the card has been read, but not acted upon, $\overline{BC}$ resets FF358 through inverter 360. In the particular card reader employed, a skip operation can be produced without pressing the MCR switch. In order to move the card being skipped, the output of gate 372 is supplied to OR353 to make ESM high.

When cards run out, $\overline{PR+RR}$ will go low and reset FF351 to stop the CR. Also, when the card reader is not in use, $\overline{CRON}$ is high to reset FF351.

To insure that Field FF361 is reset and gate 359 inhibited when power is first applied, $\overline{BC}$ is applied through inverter 371 to the 0-output and to gate 359. The reader normally stops on column 82 of a card. Thus when power goes on, $\overline{BC}$ will be low and the output of 371 high to produce the desired operation.

The invention has been described in connection with a credit card checking system wherein many features have been incorporated to promote convenience in use, high reliability and versatility. It will be understood that some features may be employed and others omitted, without departing from the spirit and scope of the invention as defined in the claims. As initially stated, the invention can be used for other purposes where assigned numbers of a group require checking to determine whether they are still valid, or useable for a particular purpose. The specific embodiment herein described may be modified as required to meet the needs of such applications.

I claim:
1. A validity checking system which comprises
   (a) a cyclic memory having a plurality of cyclic sections for storing respective coded digits of assigned numbers,
   (b) input register means for receiving a coded assigned number,
   (c) coincidence means for comparing an assigned number in said register means with the assigned numbers in said cyclic memory and producing coincidence signals indicating the presence or absence of said number in the memory,
   (d) a plurality of interrogating units for supplying assigned numbers to said input register means,
   (e) means responsive to said coincidence signals for sending corresponding answers to said interrogating units,
   (f) means for supplying to said input register means an assigned number to be inserted in said memory or erased therefrom,
   (g) means for establishing an insert mode or an erase mode,
   (h) means for actuating said coincidence means during a first pass in either mode to determine the presence or absence of the assigned number in the memory,
   (i) means responsive to said absence in the insert mode and to said presence in the erase mode for initiating a second pass,
   (j) means utilizing said coincidence means during said second pass in the insert mode for locating a blank position in the memory and writing said assigned number therein,
   (k) means utilizing said coincidence means during said second pass in the erase mode for locating said assigned number in the memory and erasing it therefrom,
   (l) and means for producing a third pass in either mode and utilizing said coincidence means to determine the presence or absence in the memory of said assigned number in said register means and producing a corresponding signal.

2. A system in accordance with claim 1 including a plurality of cyclic zones in said cyclic memory each having said plurality of cyclic sections, means utilizing said coincidence means for simultaneously comparing an assigned number in said input register means with the assigned numbers in said plurality of cyclic zones, means operating during said second pass in the insert mode upon the simultaneous occurrence of blank positions in a plurality of zones for selecting one zone thereof for writing and excluding the others, and means operating during said second pass in the erase mode for determining the zone containing the assigned number to be erased and confining erasure thereto.

3. A system in accordance with claim 1 including a counter, means for actuating said counter in synchronism with said cyclic memory to count assigned number positions, means operating during said second pass for starting said counter from a predetermined count upon coincidence with a blank position in the insert mode and upon coincidence of said assigned number in the erase mode, and means utilizing said counter for counting a complete cycle from said predetermined count to effect said writing in the insert mode and said erasing in the erase mode.

4. A system in accordance with claim 3 including means utilizing said counter for determining at least a complete cycle of the cyclic memory for said first pass, and means for stopping said counter at said predetermined count at the end of said first pass.

5. A system in accordance with claim 3 including means for utilizing said counter for an assigned number from an interrogating unit to count a plurality of complete cycles of said memory, means utilizing said coincidence means for making separate determinations of the presence or absence of an assigned number in said memory in each of said cycles, means responsive to agreement of said determinations for producing a corresponding answer to the interrogating unit, and means responsive to disagreement of said determinations for producing an error signal to the interrogating unit.

6. A system in accordance with claim 1 including
   (a) a plurality of groups of stages in said input register means for respective digits of an assigned number, each group having a plurality of stages for respective bits of a digit,
   (b) input circuits for the respective stages of a predetermined group of said register means,
   (c) means for supplying to said input circuits serial digits of an assigned number with the bits of each digit occurring simultaneously,
   (d) means for shifting the bits of each digit to respective succeeding groups prior to supplying a succeeding digit to said predetermined group,
   (e) a digit counter for counting digits supplied to said predetermined group,
   (f) means responsive to a predetermined count of said counter corresponding to a complete assigned number for inhibiting further supply of digits to said predetermined group and connecting each group of stages for recycling,
   (g) means for recycling the bits in each group synchronously with the bit rate of said cyclic memory,
   (h) and means for supplying bit signals from each of said groups to said coincidence means.

7. A system in accordance with claim 6 including means responsive to the bits of each digit supplied to said input circuits for producing a corresponding strobe pulse, and means responsive to each strobe pulse for entering the bits of the corresponding digit in respective stages of said predetermined group.

8. A system in accordance with claim 7 including means for supplying said strobe pulses to said digit counter for counting the corresponding digits, means for producing synchronizing signals from said memory at assigned number rate and at bit rate therein, means responsive to said strobe pulses and to said synchronizing signals for producing a series of shift pulses at said bit rate equal in number to the stages of a group for each strobe pulse and delayed at least one assigned number interval with respect thereto, and means utilizing said shift pulses for said shifting of bits of each digit to succeeding groups in sequence.

9. A system in accordance with claim 6 in which said groups of the input register means are equal in number to the digits of an assigned number, and including means for transferring the digit first-entered in said predetermined group from the last of said groups to said predetermined group as the last-entered digit is transferred from said predetermined group.

10. A system in accordance with claim 1 in which each digit of an assigned number stored in a respective cyclic section of said memory is coded in a predetermined fixed number of bits, and including counting means continuously responsive to the bits in each of said cyclic sections for each of said assigned numbers, and means for producing an error signal when said counting means depart from predetermined conditions at the end of stored assigned number.

11. A system in accordance with claim 1 including an automatic reader for reading coded assigned numbers recorded on a record medium, said record medium containing at least one identifying bit position for each assigned number for indicating an insertion or erasure of the corresponding assigned number, means for supplying assigned numbers from said reader to said input register means, and means for utilizing bits in said identifying bit position to control said means for establishing an insert mode or an erase mode.

12. A system in accordance with claim 1 including a tape reader for supplying to said input register means assigned numbers to be inserted in said memory or erased therefrom, the tape of said reader having a plurality of columns for recording bits therein, the bits of each digit being recorded in separate row and in predetermined columns in accordance with a predetermined code, a separate column of said tape containing an identifying bit in the first digit row of an assigned number for indicating the start thereof, and means responsive to the start identifying bit for controlling the entry of the assigned number in said input register means.

13. A system in accordance with claim 12 including a separate column of said tape containing an identifying bit in the last digit row of an assigned number for indicating the end thereof, means for counting the digits of an assigned number supplied from the tape reader to said input register means and producing a signal at a predetermined count corresponding to a complete assigned number, and means responsive to said signal and to said end identifying bit for indicating non-coincidence thereof.

14. A system in accordance with claim 12 including at least one separate column of said tape containing an identifying bit in at least one of the rows of an assigned number for indicating whether the assigned number is to be inserted or erased, and means for utilizing said identifying bit to control said means for establishing said insert mode or erase mode.

15. A system in accordance with claim 1 in which each of said interrogating units includes manual means for entering an assigned number therein, means for storing and displaying the entered assigned number, means for transmitting the entered assigned number to said input register means, means for receiving an answer alternatively corresponding to the presence or absence in said memory of the entered assigned number, means responsive to a said answer for producing a corresponding indication and clearing the entered assigned number, and means responsive to an answer corresponding to an error for producing a corresponding indication and leaving the assigned number stored.

16. A system in accordance with claim 1 including a binary counter for repeatedly producing binary digits simultaneously in respective address lines in coded combinations corresponding successively to successive counts thereof, connections from each of said interrogating units to said address lines, decoding means in each of said interrogating units for recognizing a different coded combination in said address lines, means in each of said units responsive to the recognition of its respective coded combination for establishing a hold circuit stopping said counter, and means in each of said units responsive to an answer thereto for releasing said hold circuit and allowing the counter to resume counting.

17. A validity checking system which comprises
 (a) a cyclic memory having a plurality of cyclic zones each having a plurality of cyclic sections for storing respective coded digits of assigned numbers,
 (b) input register means for receiving a coded assigned number,
 (c) a plurality of interrogating units for supplying assigned numbers to said input register means,
 (d) coincidence means for simultaneously comparing an assigned number in said input register means with the assigned numbers stored in said plurality of zones in the memory and producing coincidence signals indicating the presence or absence of said number in said memory,
 (e) means responsive to said coincidence signals for sending corresponding answers to said interrogating units,
 (f) means for supplying to said input register means an assigned number to be inserted in said memory or erased therefrom,
 (g) means for establishing an insert mode or an erase mode,
 (h) means for locating a blank position in said memory in said insert mode for inserting therein an assigned number from said input register means,
 (i) means for recognizing the simultaneous occurrence of blank positions in a plurality of zones and selecting one zone thereof for said inserting and excluding the others,
 (j) and means for determining the zone of said memory containing an assigned number in said input register means during an erase mode and confining erasure thereto.

18. A system in accordance with claim 17 in which each digit of an assigned number stored in a respective cyclic section of said memory is coded in a predetermined fixed number of bits, and including means for continuously counting the number of bits in each of said cyclic sections for each of said assigned numbers, and means for producing an error signal when said counting departs from said predetermined fixed number of bits.

19. A validity checking system which comprises
 (a) a cyclic memory having a plurality of cyclic sections for storing respective coded digits of assigned numbers,
 (b) an input register for receiving a coded assigned number,
 (c) said register having a plurality of groups of stages for respective digits of an assigned number, each group having a plurality of stages for respective bits of a digit,
 (d) input circuits for the respective stages of a predetermined group of said register,
 (e) a plurality of interrogating units for supplying coded assigned numbers to said input register,
 (f) each of said interrogating units being adapted to supply to said input circuits serial digits of an assigned number with the bits of each digit occurring simultaneously,
 (g) means for shifting the bits of each digit to respective succeeding groups prior to supplying a succeeding digit to said predetermined group,
 (h) a digit counter for counting digits supplied to said predetermined group,
 (i) means responsive to a predetermined count of said counter corresponding to a complete assigned number for inhibiting further supply of digits to said predetermined group and connecting each group of stages for recycling,
 (j) means for recycling the bits in each group synchronously with the bit rate of said cyclic memory,
 (k) coincidence means supplied with the bit signals from each of said groups and with the coded assigned numbers in said memory for producing coincidence signals indicating the presence or absence in the memory of the corrresponding assigned number, (1) and means responsive to said coincidence signals for sending corresponding answers to said interrogating units.

20. A system in accordance with claim 19 including
(a) means responsive to the bits of each digit supplied to said input circuits for producing a corresponding strobe pulse,
(b) and means responsive to each strobe pulse for entering the bits of the corresponding digit in respective stages of said predetermined group.

21. A system in accordance with claim 9 including means responsive to the bits shifted from said predetermined group to the next-succeeding group for checking the parity thereof.

References Cited
UNITED STATES PATENTS

| | | | |
|---|---|---|---|
| 2,932,010 | 4/1960 | Mayer et al. | 340—174.1 |
| 3,394,246 | 7/1968 | Goldman | 340—149 XR |
| 3,184,714 | 5/1965 | Brown et al. | 340—149 |

DONALD J. YUSKO, Primary Examiner

U.S. Cl. X.R.

235—61.7; 340—174.1